United States Patent
White et al.

(10) Patent No.: US 9,550,845 B2
(45) Date of Patent: Jan. 24, 2017

(54) MULTIPLE STAGE CURABLE POLYMER WITH CONTROLLED TRANSITIONS

(71) Applicant: The Board of Trustees of the University of Illinois, Urbana, IL (US)

(72) Inventors: Scott White, Champaign, IL (US); Nancy Sottos, Champaign, IL (US); Jeffrey Moore, Savoy, IL (US); Ryan Gergely, Urbana, IL (US); Brett Krull, Urbana, IL (US); Windy Ann Santa Cruz, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 148 days.

(21) Appl. No.: 14/626,327

(22) Filed: Feb. 19, 2015

(65) Prior Publication Data

US 2016/0264695 A1    Sep. 15, 2016

Related U.S. Application Data

(60) Provisional application No. 61/976,793, filed on Apr. 8, 2014.

(51) Int. Cl.
    *C08L 61/02*    (2006.01)
    *C08F 283/00*    (2006.01)
    (Continued)

(52) U.S. Cl.
    CPC .......... *C08F 120/28* (2013.01); *C08F 122/10* (2013.01); *C08G 63/688* (2013.01)

(58) Field of Classification Search
    CPC ..... C08F 120/28; C08F 122/10; C08G 63/688
    (Continued)

(56) References Cited

U.S. PATENT DOCUMENTS

| 4,096,202 A | 6/1978 | Farnham et al. |
| 4,886,851 A | 12/1989 | Ikenaga et al. |

(Continued)

FOREIGN PATENT DOCUMENTS

| EP | 0003652 B1 | 9/1982 |
| EP | 2254127 A1 | 11/2010 |

OTHER PUBLICATIONS

Deng et al., "Covalent Cross-Linked Polymer Gels with Reversible Sol-Gel Transition and Self-Healing Properties," Macromolecules, American Chemical Society, Apr. 1, 2010. 43: pp. 1191-1194.*

(Continued)

*Primary Examiner* — William Cheung
(74) *Attorney, Agent, or Firm* — Haukaas Fortius PLLC; Michael H. Haukaas

(57) ABSTRACT

The invention provides a polymer system, including a first composition and a second composition. The first composition is different from the second composition. The first composition includes a first gelator, the first gelator including a plurality of acylhydrazine moieties. The second composition includes a second gelator, the second gelator including a plurality of formyl moieties. At least one of the first composition and the second composition includes a prepolymer. The invention further provides a method of using the polymer system to form a polymeric material via multiple stages to more effectively control the rheology of the components over a variety of timescales.

20 Claims, 9 Drawing Sheets

(51) Int. Cl.
*C08F 2/00* (2006.01)
*C08F 20/06* (2006.01)
*C08F 118/02* (2006.01)
*C08F 120/28* (2006.01)
*C08F 122/10* (2006.01)
*C08G 63/688* (2006.01)

(58) Field of Classification Search
USPC ............... 526/319, 317.1, 209; 525/398, 535
See application file for complete search history.

(56) References Cited

U.S. PATENT DOCUMENTS

| | | | |
|---|---|---|---|
| 6,766,817 | B2 | 7/2004 | Silva |
| 7,857,447 | B2 | 12/2010 | Myung et al. |
| 7,981,481 | B2 | 7/2011 | Xu et al. |
| 2006/0062922 | A1 | 3/2006 | Xu et al. |
| 2013/0189888 | A1 | 7/2013 | Patrick et al. |

OTHER PUBLICATIONS

Akhlaghi et al., "Simultaneous study of cure kinetics and rheology of montmorillonite/vinyl ester resin nanocomposites," Polymers for Advanced Technologies, Feb. 14, 2011. 23: 534-544.

Balazs et al., "Nanoparticle Polymer Composites: Where Two Small Worlds Meet," Science Mag, Nov. 17, 2006. vol. 314: pp. 1107-1110.

Belon et al., "Overcoming the Oxygen Inhibition in the Photopolymerization of Acrylates: A Study of the Beneficial Effect of Triphenylphosphine," Journal of Polymer Science, Mar. 9, 2010. 48: pp. 2462-2469.

Blaiszik et al., "Self-Healing Polymers and Composites," Annu. Rev. Mater. Res., Apr. 5, 2010. 40: pp. 179-211.

Chen et al., "A Thermally Re-mendable Cross-Linked Polymeric Material," Science Mag, Mar. 1, 2002. 295: pp. 1698-1702.

Cordier et al., "Self-healing and thermoreversible rubber from supramolecuar assembly," Nature, Feb. 21, 2008. 451: pp. 977-980.

Murphy et al., "The world of smart healable materials," Elsevier Progress in Polymer Science, Nov. 3, 2009. 35: pp. 223-251.

O'Brien et al., "Oxygen Inhibition in Thiol-Acrylate Photopolymerizations," Journal of Polymer Science, 2006. 44: pp. 2007-2014.

Toohey et al., "Delivery of Two-Part Self-Healing Chemistry via Microvascular Networks," Journal of Advanced Functional Materials, 2009. 19: pp. 1399-1405.

White et al., "Autonomic healing of polymer composites," Nature, Feb. 15, 2001. 409: pp. 794-817.

Wool et al., "Self-healing materials: a review," The Royal Society of Chemistry, Jan. 10, 2008. 4: pp. 400-418.

\* cited by examiner

MULTIPLE STAGE CURABLE POLYMER WITH CONTROLLED TRANSITIONS

RELATED APPLICATIONS

This application claims priority under 35 U.S.C. §119(e) to U.S. Provisional Patent Application No. 61/976,793, filed Apr. 8, 2014, which is incorporated herein by reference.

GOVERNMENT SUPPORT

This invention was made with government support under Grant No. 392 AF FA9550-01-1-0255 awarded by the Air Force Office of Scientific Research. The government has certain rights in the invention.

BACKGROUND OF THE INVENTION

Polymers provide tremendous benefits to society. Their use can be seen almost everywhere, from materials used in space, water, automobiles, electronics, households, and medicine to name a few areas. Polymer products can be lightweight, hard, strong, and flexible and have distinct thermal, electrical, and optical characteristics. Accordingly, polymer systems garner a tremendous amount of research and development. Scientists continue to develop polymer systems with improved properties. One of the challenges facing these scientists is how to precisely control the rheological properties of polymers, which are critical for many manufacturing processes. Another challenge is the development of improved methods for repairing and restoring an area of a material that has been damaged.

Organogels have been a topic of concentrated research over the past several years. Organogels use organic solvents as the swelling agent as opposed to a "hydrogel" in which the swelling agent is water. Proposed applications for organogels include their use as viscosity modifiers, drug delivery systems, and electrical cable insulators (see EP 2254127 A1). For example, one paper showed organogels consisting of reversible covalently bonded polymers in various organic solvents (Deng et al., *Macromolecules* 2010-43(3):1191-1194). However, such systems are typically singular in composition, having only one polymerization reaction with a single trigger. The organogels also typically possess mechanical properties that are too soft for structural applications.

Traditional polymer cure cycles are generally characterized by a single transition from a liquid state to a rigid state, which limits processing capabilities. Multiple component and multiple stage polymers have been described for the benefit of obtaining the properties of several components within a single system (see EP0003652 B1, and U.S. Pat. No. 4,096,202 (Farnham et al.), U.S. Pat. No. 4,886,851 (Ikenaga et al.), and U.S. Pat. No. 7,857,447 (Myung et al.)). Acrylate systems have been of particular interest due to the economic and industrial importance of poly(acrylate) polymers. Traditional methods based on multiple component and multiple stage systems generally require direct engineering control of the system to obtain the desired composition and structure. In some cases, polymers are synthesized independently and then blended together. Traditional polymer cure cycles have been tailored to possess different cure rates based on the alteration of the kinetics of the polymerization. However, the range of control is usually dictated by the reaction temperature. The polymerization proceeds in a singular fashion from a liquid of a designed viscosity to a solid of a designed modulus.

Additional challenges presented by traditional polymeric materials are the processing limitations caused by the polymer's high viscosity and its susceptibility to oxygen inhibition. Rapidly reacting systems, such as commercially available epoxy resins (e.g., Devcon 5 Minute® epoxy), possess relatively high viscosities of about 10,000 centipoise (cps). Lower viscosity (about 60 cps) epoxy resin systems exist, but react very slowly at room temperature and usually require curing at temperatures of 70° C. for 8 or more hours. Traditional acrylate resins can be characterized by much lower viscosities, but generally suffer from oxygen inhibition during free radical polymerization. Several techniques have been suggested to help counteract this problem. However, the techniques involve the use of new initiating systems (see U.S. Publication No. 2006/0062922 (Xu et al.)), implementation of oxygen scavengers, and incorporation of thiol monomers.

Accordingly, there is a need for improving the rheological and mechanical properties of polymer materials, particularly, for the restoration of large damage volumes, defects, or other spaces in polymers. There is also a need for improved polymer systems that can easily and efficiently repair and restore (regenerate) impaired areas of a material. These needs are met by the polymer systems and methods described herein.

SUMMARY

The invention provides an improved polymer system comprising multiple reactive components, which are each stable in its latent form, but become reactive upon a controlled chemical or physical trigger, to initiate a staged gelation and polymerization process.

In one aspect, the polymer system includes a first composition and a second composition. The first composition is different from the second composition. The first and second compositions are stable in isolation from each other, but react in the presence of each other. The first composition includes a first gelator and the first gelator includes a plurality of acylhydrazine moieties. The second composition includes a second gelator and the second gelator includes a plurality of formyl moieties. One of the first composition and the second composition can include a gel catalyst, such as a protic acid. The first composition and the second composition can each optionally include both a first gelator and a second gelator provided that the first or second composition that includes both acylhydrazine-containing compounds and formyl moiety-containing compounds does not also include a gel catalyst. At least one of the first composition and the second composition can include a prepolymer, a promoter, an initiator, or a combination thereof. When combined, the first and second composition react with one another, resulting in the formation of a gel prior to a polymerization that results in a solid polymer composition.

In another aspect, a device includes a first vessel and a second vessel, the first vessel containing a first composition, the second vessel containing a second composition. The first composition is different from the second composition. The first composition includes a first gelator, the first gelator including a plurality of acylhydrazine moieties. The second composition includes a second gelator, the second gelator including a plurality of formyl moieties. At least one of the first composition and the second composition includes a prepolymer.

In still another aspect, a method of manufacturing a device includes: introducing a first composition into a first vessel in a device, and introducing a second composition into a second vessel in the device. The first composition includes a first gelator, the first gelator including a plurality of acylhydrazine moieties. The second composition includes a second gelator, the second gelator including a plurality of formyl moieties. At least one of the first composition and the second composition includes a prepolymer.

In yet other aspects of the invention, the first and/or second compositions further include at least one of a gelation catalyst, a polymerization initiator, a polymerization promoter, and a polymerization inhibitor.

In certain aspects of the invention, the first gelator includes at least two acylhydrazine moieties, and the second gelator includes at least three formyl moieties.

triggering the combination of the first and second compositions to initiate a dual-stage reaction of the components of the compositions, where the liquid compositions sequentially transition first to a gel, and second to a polymer, to form the polymeric material.

In certain embodiments of the invention, the prepolymer forms a thermoplastic polymer. In other embodiments, the prepolymer forms a thermoset polymer.

In a specific embodiment of the invention, the polymeric material formed comprises a first polymer and a second polymer, wherein the first polymer comprises a polymer of Formula I:

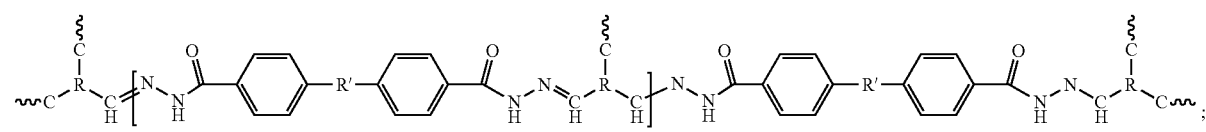

(I)

In still other aspects of the invention, one of the two gelators includes at least two acylhydrazine moieties, and the other composition that includes a gelator includes a gelator having at least two acylhydrazine moieties and a gelator having at least three formyl moieties. Thus, in certain embodiments of the invention, a first gelator is present in both the first and second compositions.

In a specific embodiment of the invention, the first gelator comprises bis-acylhydrazine terminated poly(ethylene)glycol.

In a specific embodiment of the invention, the second gelator comprises tris[(4-formylphenoxy) methyl]ethane.

In a specific embodiment of the invention, the first gelator comprises bis-acylhydrazine terminated poly(ethylene) glycol, the second gelator comprises tris[(4-formylphenoxy) methyl]ethane, the prepolymer comprises 2-hydroxyethyl methacrylate (HEMA) or a combination of trimethylolpropane tris(3-mercaptopropionate) (TMPTMP) and 1,3-glyceryl dimethacrylate (GDMA), and the system optionally further comprises a gelation catalyst, a polymerization initiator, a polymerization promoter, a polymerization inhibitor, or a combination thereof.

In certain embodiments of the invention, the prepolymer is an alkyl acrylate, a thiol-ene, or a combination thereof.

In certain embodiments of the invention, the first and second compositions, upon contacting each other, first form a gel, followed by a polymerization product, wherein the two transitions occur at ambient temperature (e.g., less than 30° C., less than about 25° C., or at about 22-23° C.).

The invention thus provides a method of forming a polymeric material, including
  providing a liquid first composition and a liquid second composition separated from one another, where the first composition is different from the second composition,
  the first composition including a first gelator, the first gelator including a plurality of acylhydrazine moieties,
  the second composition including a second gelator, the second gelator including a plurality of formyl moieties,
  at least one of the first and second compositions including a prepolymer,
  optionally, further including a gelation catalyst, a polymerization initiator, a polymerization promoter, a polymerization inhibitor, or a combination thereof, and wherein ∿∿∿ is an additional moiety as shown within the brackets of Formula I;
R is

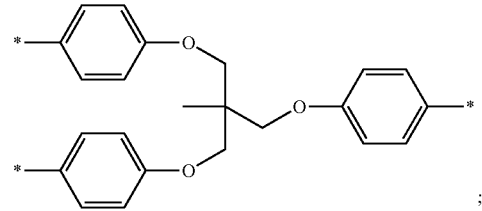 [SMILES: *c1ccc(OCC(C)(COc2ccc(*)cc2)COc2ccc(*)cc2)cc1]

and
R' is

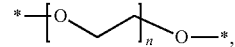

wherein n is about 3 to about 150 (e.g., 3, 4, 5, 6, about 10, about 20, about 50, about 100, about 150, or a range between any two preceding integers); and
the second polymer comprises a polymer of Formula II:

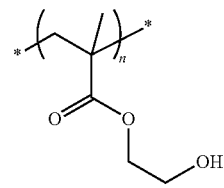

(II)

wherein n is about 100 to about 1,000 (e.g., about 100, about 200, about 300, about 400, about 500, about 750, about 1000, or a range between any two preceding integers);

or the second polymer comprises a polymer of Formula III:

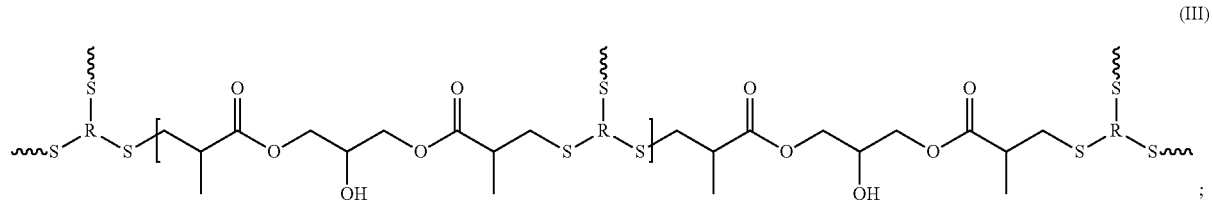

wherein:
~~~ is an additional moiety as shown within the brackets of Formula III; and
R is:

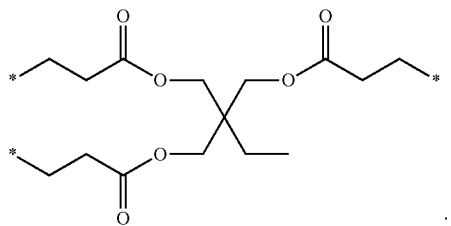 [SMILES: *CCC(=O)OCC(CC)(COC(=O)CC*)COC(=O)CC*]

In certain aspects of the invention, the polymer system is a self-healing system.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
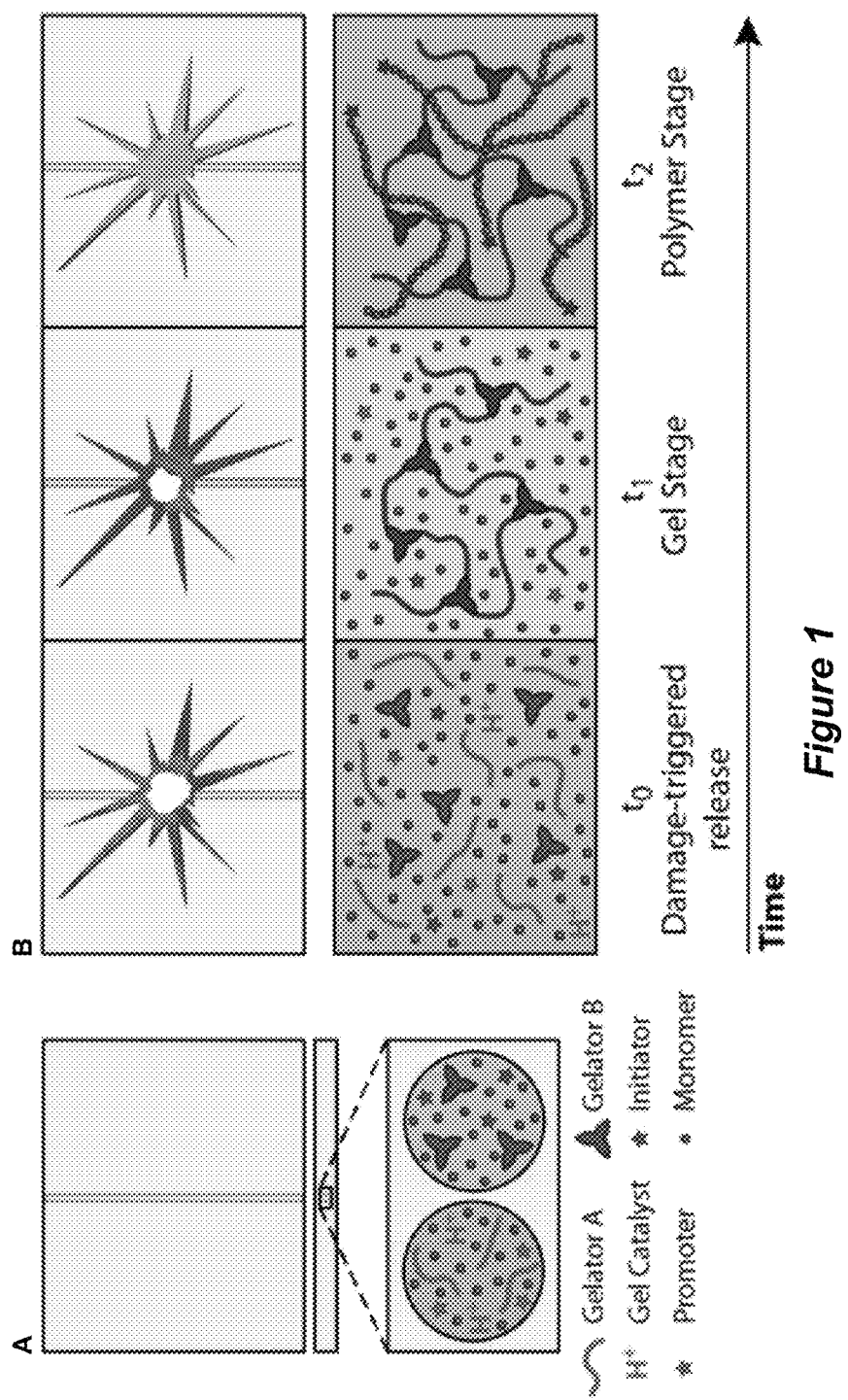
FIG. 1. A two-stage restoration (regeneration) strategy, according to an embodiment. (A) Reactive monomer solutions are incorporated into a vascularized specimen (left and right channels). (B) Time $t_0$, impact damage initiates fluid release into a region having a void allowing for combination of the solutions. Time $t_1$, the gel stage occurs by covalent crosslinking of Gelators A and B with a catalyst such as an acid ($H^+$). Deposition of fluid and subsequent gelation continues until the void is filled. Time $t_2$, the polymer stage follows with bulk polymerization of monomer using a two-component initiation system, which recovers structural performance. Examples of suitable chemical species of the two-stage resin system are shown in Scheme 3.

A two-stage polymer system is provided, which allows for precise control of the rheological properties of the reactive species. Three distinct reactive species that are stable in their latent states are combined in such a way as to control the multiple rheological stages of the reactions. In one embodiment, there are three rheological stages to which the reactive species sequentially transition—liquid to gel to solid. In some embodiments, the reactions are triggered by the order of the mixing of the reactive species. In other embodiments, the reactions are triggered by the introduction of a chemical, such as a catalyst or an initiator. The triggers may be initiated by a human or automated via a machine, computer or other device. In one embodiment, the trigger is initiated by a catastrophic event to a host material that adversely affects the integrity of the host material. For example, an exogenous event, such as a severe impact (e.g., ballistic impact) to a host material can cause substantial mass loss in the host material. The severe impact can also be utilized as the trigger to release the reactive species of the invention to the damaged areas in need of repair. In this manner, the invention is self-healing and may be tailored to trigger upon the occurrence of any parameter (e.g., extreme temperature, moisture, pressure, etc.) that contributes to a catastrophic event.

In one embodiment, gelation of a prepolymer composition is followed by polymerization of the gelled prepolymer to a rigid structural polymer. The gel formation accomplishes the need to sufficiently fill the gaps (voids) stemming from the mass loss in the host material. The subsequent conversion to the polymer stage completes the restorative process. Additionally, formation of the gel may also protect the polymerization reaction from the effects of oxygen inhibition. In such cases, the two-stage polymer chemistry can be implemented with small monomer precursors, such as acrylates, resulting in rapidly reacting compositions that are characterized by relatively low viscosities on the order of 50 cps and lower. A rapidly reacting system is thus achieved without the high viscosities typical of traditional rapidly reacting systems.

While gelation generally impedes oxygen inhibition, there are cases where gelation alone will not fully protect the polymerization reaction from the effects of oxygen inhibition. For example, the gelled HEMA system described herein may not fully polymerize in ambient conditions under an aerobic environment. In such cases, one may use a thiol-containing system to ensure a full cure in an aerobic environment. The thiol-containing system does not polymerize until after gelation has occurred. Thus oxygen scavengers can be optionally excluded from such systems.

In one embodiment, a first composition is contained in a first vessel, and a second composition is contained in a second vessel. The components of the first composition are different from the second composition. The first composition includes a first gelator including a plurality of acylhydrazine (—(CO)—NH—NH$_2$) moieties, and the second composition includes a second gelator including a plurality of formyl (—CHO) moieties. At least one of the first composition and the second composition includes a prepolymer. One or both of the first composition and the second composition may further include a solvent, thereby forming a solution, suspension, or emulsion. In some embodiments, the first and second compositions are each independently characterized by viscosities of from about 5 cps to about 250 cps. It is common for the first composition to have a viscosity of about 10-20 cps; the second composition can have a higher viscosity than the first composition. The thiol-containing system described herein can have viscosities on the order of about 200 cps to about 300 cps, or about 250 cps, for the first composition and about 50 cps to about 150 cps, or about 100 cps for the second composition.

In a self-healing embodiment, an event that leads to significant mass loss in a host material can be used as a trigger to release the first composition and the second composition, to initiate their subsequent mixing, and to initiate a dual-stage restoration process. When mixed, the low viscosity first composition and the low viscosity second composition give rise to the formation of a gel by reaction of the first gelator and the second gelator. This step produces the first transition of the material state of the compositions—from liquid to gel. The gel can form through the creation of a cross-linked network of dynamic acylhydrazone bonds by acid-catalyzed condensation. The chemistry is capable of gelling in a wide range of organic liquids, and is particularly applicable to liquid prepolymers, such as acrylic and thiol-ene monomer precursors, optionally, in the presence of an organic solvent. Deposition of the first composition and the second composition can continue until the void left by the mass loss is substantially filled by the resulting polymer composition.

In one embodiment, the gel is substantially formed within 30 seconds or within 1 minute of the damage-causing event and/or the contacting of the first and second compositions. The gel is substantially formed when more than half of the available reactive acylhydrazine or formyl groups (with respect to the limiting reagent) have reacted in the presence of the gelation catalyst. In further embodiments, gel formation can occur over longer periods of time, such as from about one minute to about five minutes, about two minutes to about thirty minutes, about ten minutes to about one hour, or about two minutes up to several hours (e.g., about 3 to about 8 hours), but prior to the polymer stage. Even longer gel formation periods can be employed, for example, from about one day to about several days, depending on the components of the first and second compositions. Changing the solvent/monomer, catalyst species, catalyst concentration, or oligomer molecular weight can each affect the gelling time of the system. For instance, the gelation period can be modified by the addition of more or less acid catalyst, to increase or decrease the time to complete the gelation stage. In some embodiments, the gel can form in about two hours using a dichloroacetic acid (DCA) gel catalyst. The strength of the acid catalyst can also affect the gelation time. For example, the gel formation period can be increased by about 10-30 times longer by using glacial acetic acid (a weaker acid than DCA).

The mixing of the first composition and second composition also initiates polymerization of the prepolymer, to form a structural polymer. In some embodiments, it is advisable to avoid premature stiffening of the restorative material. In these situations, the time during which a solid polymer is formed occurs on a timescale longer than the time during which the gel is formed and continues to run from the end of gel formation to the formation of a self-supporting structural polymer. This step produces the second transition of the material state of the compositions—from gel to solid. Gelation and polymerization in a desired temperature range may be achieved by judicious choice of gelators, gelation catalysts, polymerization initiators, polymerization promoters, and polymerization inhibitors. As such, the two-stage chemistry may be formulated to occur at room temperature (~22° C.), so no additional control over reaction temperature is necessary in order to trigger gelation and polymerization.

Because the two-stage chemistry relies on multiple and distinct reactive pathways, changes in chemical concentrations, molecular weights, and molecular structures can influence the scale of the gelling and polymerization reactions in a controllable, repeatable manner, thereby displaying a degree of chemical and mechanical controls significantly greater than traditional systems. Various stages of mechanical properties can thus be obtained, and intermediate stages can exist for extended periods and possess properties between the initial liquid and final solid states. As such, rheological control can be achieved over a wide range of timescales, resulting in restorative materials having a "staged" rheological behavior.

The first and second gelators are chosen with a view to achieving stable, homogenous, low-viscosity compositions when combined with the other components of the first and second compositions. The first gelator includes at least two acylhydrazine moieties. One example class of first gelators is represented by a poly(ethylene glycol) that is functionalized at both ends with functional groups, including an acylhydrazine moiety. Gelator A (e.g., bis-acylhydrazine terminated PEG) of Scheme 3 in the Examples section below is one such polyethylene glycol-derived first gelator. Other examples of first gelators include 2,5-diethoxy-terephthalohydrazide, 2,2'-[oxybis(2,1-ethanediyloxy)]bis-acetic acid dihydrazide, 1,6-dihydrazide hexanedioic acid, 1,14-dihydrazide tetradecanedioic acid, 1,7-dihydrazide heptanedioic acid, 1,3-dihydrazide propanedioic acid, 3,3'-dithiobis(propanoic dihydrazide), 2,2'-[[2-(1,1-dimethylethyl)-1,4-phenylene]bis(oxy)] bis-acetic acid dihydrazide, and 5,5'-(1,1,3,3,5,5,7,7-octamethyl-1,7-tetrasiloxanediyl) bis-pentanoic acid 1,1'-dihydrazide. (See Scheme G-1 below.) In some embodiments, the $M_n$ of the first gelator is about 200 to about 5000 Da, about 500 to about 5000 Da, about 1000 to about 3000 Da, about 1500 to about 2500 Da, or about 200 to about 500 Da.

Scheme G-1. Examples of First Gelators.

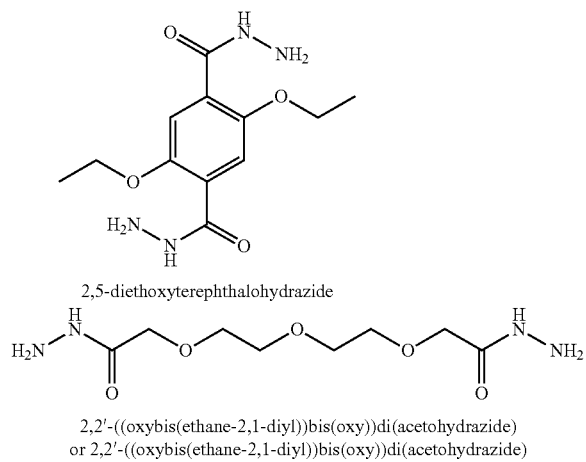

2,5-diethoxyterephthalohydrazide 2,2'-((oxybis(ethane-2,1-diyl))bis(oxy))di(acetohydrazide)
or 2,2'-((oxybis(ethane-2,1-diyl))bis(oxy))di(acetohydrazide)

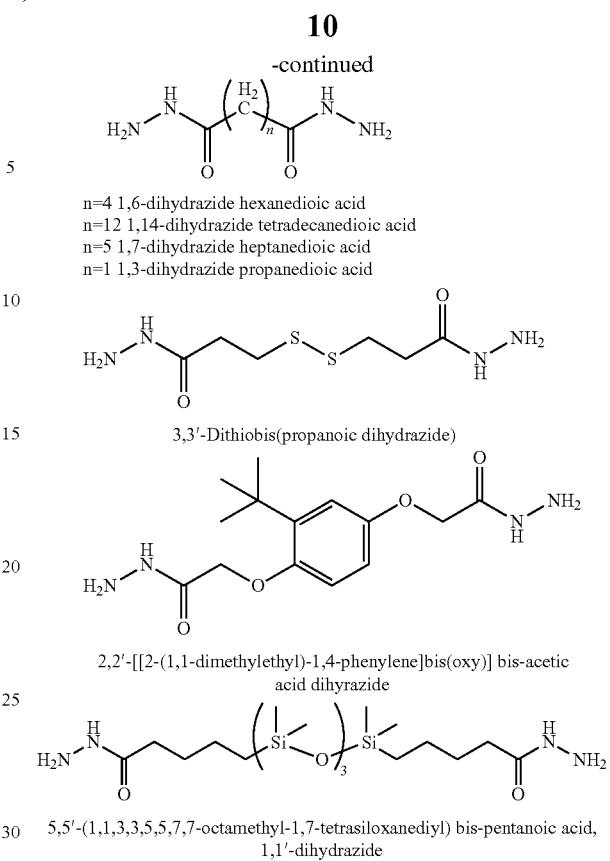

n=4 1,6-dihydrazide hexanedioic acid
n=12 1,14-dihydrazide tetradecanedioic acid
n=5 1,7-dihydrazide heptanedioic acid
n=1 1,3-dihydrazide propanedioic acid 3,3'-Dithiobis(propanoic dihydrazide)

2,2'-[[2-(1,1-dimethylethyl)-1,4-phenylene]bis(oxy)] bis-acetic acid dihyrazide 5,5'-(1,1,3,3,5,5,7,7-octamethyl-1,7-tetrasiloxanediyl) bis-pentanoic acid, 1,1'-dihydrazide The second gelator includes at least two formyl moieties. In certain embodiments, the second gelator includes three formyl moieties. The formyl moieties of a second gelator can produce a cross-linked structure in the presence of a first gelator. One such tri-functionalized second gelator is tris[(4-formylphenoxy)methyl]ethane, labeled as Gelator B in Scheme 3 in the Examples section below. Other example second gelators include 1,3,5-triformyl-benzene, 3,3'-[oxybis(2,1-ethanedioxy-2,1-ethanediyloxy)] bis-benzaldehyde, 1,3,5-tris-(4-formyl-phenyl)-benzene, 2,2'-[oxybis(2,1-ethanediyloxy-2,1-ethanediyloxy)] bis-benzaldehyde, aldehyde-terminated 3-armed poly(ethylene oxide), 4,4'-[(1,1,3,3,5,5-hexamethyl-1,5-trisiloxanediyl)bis(3,1-propanediyloxy)] bis-benzaldehyde, and 4,4'-[oxybis(2,1-ethanediyloxy)] bis(2-methoxy benzaldehyde). (See Scheme G-2 below.) In some embodiments, the Mn of the second gelator is about 130 to about 5000 Da, about 150 to about 5000 Da, about 1000 to about 3000 Da, about 1500 to about 2500 Da, about 120 to about 500 Da, or about 120 to about 500 Da.

Scheme G-2. Examples of Second Gelators.

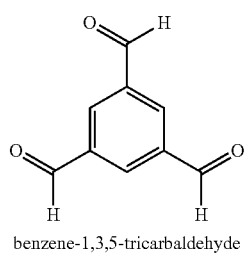

benzene-1,3,5-tricarbaldehyde

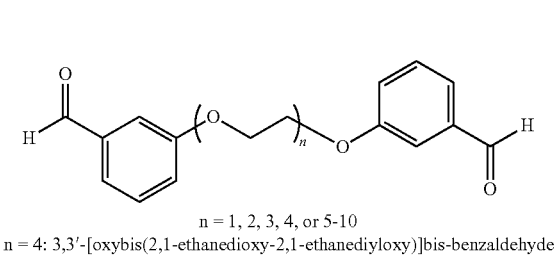

n = 1, 2, 3, 4, or 5-10
n = 4: 3,3'-[oxybis(2,1-ethanedioxy-2,1-ethanediyloxy)]bis-benzaldehyde

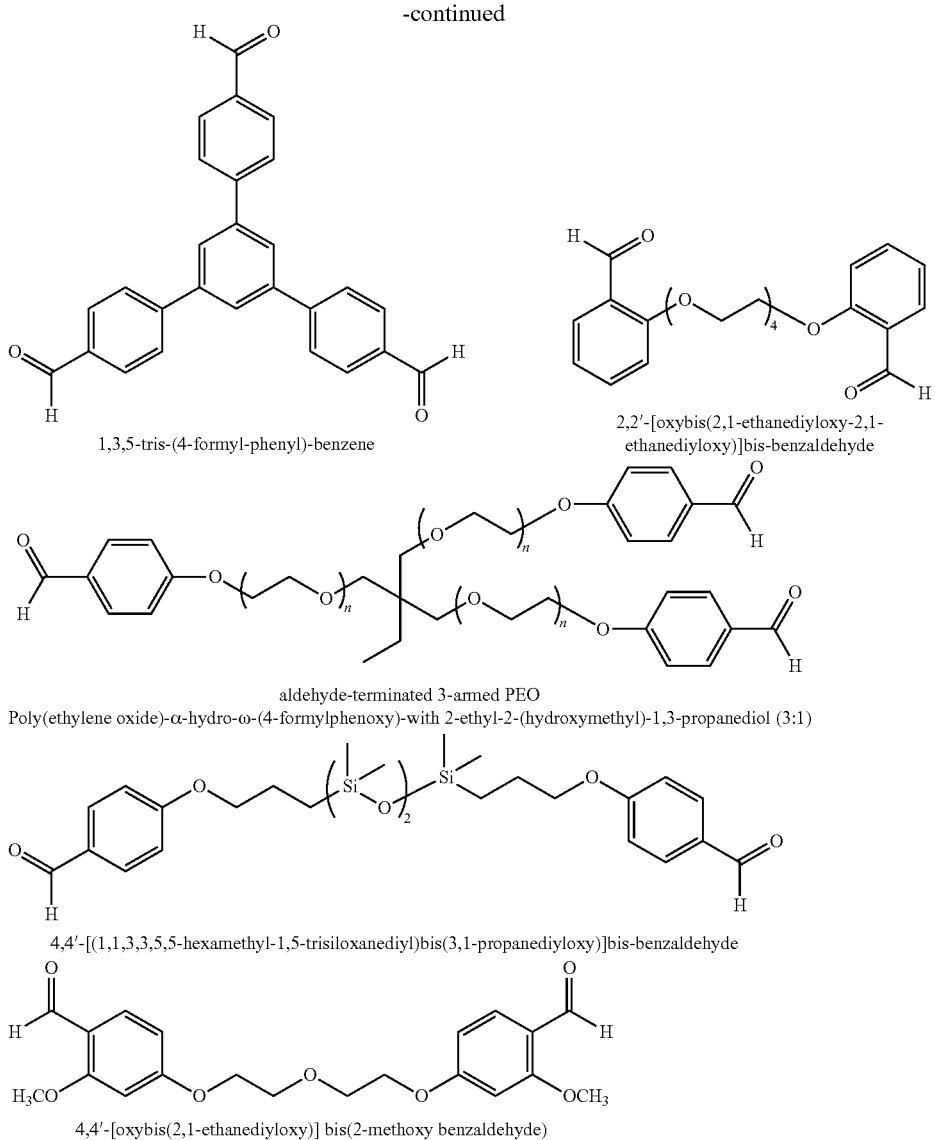

1,3,5-tris-(4-formyl-phenyl)-benzene 2,2'-[oxybis(2,1-ethanediyloxy-2,1-ethanediyloxy)]bis-benzaldehyde aldehyde-terminated 3-armed PEO
Poly(ethylene oxide)-α-hydro-ω-(4-formylphenoxy)-with 2-ethyl-2-(hydroxymethyl)-1,3-propanediol (3:1)

4,4'-[(1,1,3,3,5,5-hexamethyl-1,5-trisiloxanediyl)bis(3,1-propanediyloxy)]bis-benzaldehyde 4,4'-[oxybis(2,1-ethanediyloxy)] bis(2-methoxy benzaldehyde)

Without being bound to any particular theory, the first and second gelators are believed to react together by acid-catalyzed formation of acylhydrazone bonds. As such, an acidity modifier, such as an acid, may be added in order to accelerate the formation of the gel, i.e., as a gelation catalyst. The suitability of a gelation catalyst will depend on numerous factors, such as the level of acidity at which acylhydrazone bond formation is fastest, compatible with the chemistry and stability of other components of the first and second compositions. Example acidity modifiers include organic acids having 1 to 7 carbon atoms, such as lactic acid, acetic acid, formic acid, citric acid, benzoic acid, and p-toluenesulfonic acid. Other embodiments utilize halogenated organic acids, such as chloroacetic acid, dichloroacetic acid, trichloroacetic acid, 2-chloropropionic acid, 3-chloropropionic acid, 2,2-dichloropropionic acid, and bromoacetic acid. In one specific embodiment exemplified below, dichloroacetic acid is used. In yet other embodiments, thioglycolic acid, acrylic acid, methacrylic acid, isovaleric acid, propionic acid, and thioacetic acid can be used.

The first and second gelators can be in the first and/or second compositions, but both the first and second gelators cannot be in both the first and second compositions, because one of the compositions will include a gelation catalyst, which would initiate premature gelation in that composition (e.g., prior to contacting the first composition with the second composition). Thus, acylhydrazine moiety-containing gelators and formyl moiety-containing gelators can be in the same (first or second) composition, but not when a gelation catalyst is in that particular composition. Because the acylhydrazine component generally has a higher mass than the formyl component, it can be useful to add some acylhydrazine-containing gelator to the composition having the formyl-containing gelator in order to even out the masses of the first and second compositions.

At least one of the first composition and the second composition includes a prepolymer. Each composition can contain more than one type of prepolymer. In a typical embodiment, both the first and the second composition include a prepolymer (e.g., a monomer that reacts to form a polymer of the solid polymer composition). One or more of a polymerization initiator, polymerization promoter, and polymerization inhibitor may be included in either or both of the first composition and the second composition. For example, the prepolymer may be included in the first composition, and one or more of a polymerization initiator, polymerization promoter, and polymerization inhibitor may be included in the second composition. Alternatively, the prepolymer may be part of the second composition, or included in both the first and second compositions. Also, the first composition may include a first prepolymer, and the second composition may include a second prepolymer, where the first prepolymer and second prepolymer may subsequently co-polymerize to produce a structural co-polymer. In addition, a polymerization inhibitor may be part of either or both of the first composition and the second composition. However, in embodiments that utilize a polymerization initiator and a polymerization promoter, the initiator and promoter should not be together in the same composition, to avoid premature formation of the polymer.

Specific examples of prepolymers include polymerizable or co-polymerizable carboxyl group-containing monomer precursors, such as acrylic acid, methacrylic acid, carboxyethyl acrylate, carboxypentyl acrylate, itaconic acid, maleic acid, fumaric acid, crotonic acid and isocrotonic acid; hydroxyl group-containing monomer precursors, such as hydroxyalkyl methacrylates, for example, hydroxyethyl methacrylate, hydroxypropyl methacrylate, hydroxybutyl methacrylate, hydroxyhexyl methacrylate, hydroxyoctyl methacrylate, hydroxydecyl methacrylate, hydroxylauryl methacrylate and (4-hydroxymethylcyclohexyl) methacrylate; acid anhydride group-containing monomer precursors, such as maleic anhydride and itaconic anhydride; sulfonic acid group-containing monomer precursors, such as styrenesulfonic acid, allylsulfonic acid, 2-(meth)acrylamido-2-methylpropanesulfonic acid, (meth)acrylamidopropanesulfonic acid, sulfopropyl methacrylate and (meth)acryloyloxynaphthalenesulfonic acid; phosphoric acid group-containing monomer precursors, such as 2-hydroxyethylacryloyl phosphate; (N-substituted) amide-based monomer precursors such as (meth)acrylamide, N,N-dimethyl(meth)acrylamide, N,N-diethyl(meth)acrylamide, N-isopropyl(meth)acrylamide, N-butyl(meth)acrylamide, N-methylol(meth)acrylamide, N-methylolpropane(meth)acrylamide, N-methoxymethyl(meth)acrylamide and N-butoxymethyl(meth)acrylamide; succinimide-based monomer precursors, such as N-(meth)acryloyloxymethylenesuccinimide, N-(meth)acryloyl-6-oxyhexamethylenesuccinimide and N-(meth)acryloyl-8-oxyhexamethylenesuccinimide; maleimide-based monomer precursors, such as N-cyclohexylmaleimide, N-isopropylmaleimide, N-laurylmaleimide and N-phenylmaleimide; itaconimide-based monomer precursors such as N-methylitaconimide, N-ethylitaconimide, N-butylitaconimide, N-octylitaconimide, N-2-ethylhexylitaconimide, N-cyclohexylitaconimide and N-laurylitaconimide; vinyl esters, such as vinyl acetate and vinyl propionate; nitrogen-containing heterocyclic monomer precursors, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine and N-vinylmorpholine; N-vinylcarboxylic acid amides; lactam-based monomer precursors, such as N-vinylcaprolactam; cyanoacrylate monomer precursors, such as acrylonitrile and methacrylonitrile; aminoalkyl methacrylate-based monomer precursors, such as aminoethyl methacrylate, N,N-dimethylaminoethyl methacrylate and t-butylaminoethyl methacrylate; alkoxyalkyl methacrylate-based monomer precursors, such as methoxyethyl methacrylate and ethoxyethyl methacrylate; styrenic monomer precursors, such as styrene and α-methylstyrene; epoxy group-containing acrylic monomer precursors, such as glycidyl methacrylate; glycol-based acrylic ester monomer precursors, such as polyethylene glycol methacrylate, polypropylene glycol methacrylate, methoxyethylene glycol methacrylate and methoxypolypropylene glycol methacrylate; heterocycle, halogen atom or silicon atom-containing acrylic acid ester-based monomer precursors, such as tetrahydrofurfuryl methacrylate, fluorine methacrylate and silicon methacrylate; olefinic monomer precursors, such as isoprene, butadiene and isobutylene; vinyl ether-based monomer precursors, such as methyl vinyl ether and ethyl vinyl ether; thioglycolic acid; vinyl esters, such as vinyl acetate and vinyl propionate; aromatic vinyl compounds, such as styrene and vinyltoluene; olefins or dienes, such as ethylene, butadiene, isoprene and isobutylene; vinyl ethers, such as vinyl alkyl ethers; vinyl chloride; alkoxyalkyl methacrylate-based monomer precursors, such as methoxyethyl methacrylate and ethoxyethyl methacrylate; sulfonic acid group-containing monomer precursors, such as sodium vinylsulfonate; imido group-containing monomer precursors, such as cyclohexylmaleimide and isopropylmaleimide; isocyanate group-containing monomer precursors, such as 2-isocyanatoethyl methacrylate; fluorine atom-containing methacrylates; silicon atom-containing methacrylates; and the like.

In some embodiments, the monomer precursors include acrylates, such as methyl acrylate, ethyl acrylate, butyl acrylate, 2-ethylhexyl acrylate, methyl methacrylate, ethyl methacrylate, butyl methacrylate, 2-hydroxyethyl methacrylate (HEMA), and 1,3-glyceryl dimethylacrylate (GDMA); and thiol-ene monomer precursors, such as trimethylpropane tris(3-mercaptopropionate) (TMPTMP), triallyl-1,3,5-triazine-2,4,6-trione (TATATO), and pentaerythritol tetra(3-mercaptopropionate) (PETM). Other thiol-ene monomer precursors include 1,2-ethylene glycol bis(3-mercaptopropionate), ethylene glycol bis(thioglycolate), trimethylolpropane tris (3-mercaptopropanoate), pentaerythritol (3-mercaptopropionate), trimethylolpropane tris(thioglycolate), and tris[2-(3-mercaptopropionyloxy)ethyl] isocyanurate. One, two or more monomer precursors may be used, for instance, a combination of a methacrylate and a thiol-ene monomer precursor.

To initiate the polymerization reaction, one or more of the polymerization initiators may be employed over a range of concentrations, and optimum initiator concentrations will depend on the desired rate and degree of polymerization. In the instance of radical polymerization reactions, the initiator may be an organic peroxide chosen from ketone peroxides, diacyl peroxides, dialkyl peroxides, peroxyesters, peroxyketals, hydroperoxides, peroxydicarbonates, and peroxymonocarbonates; an azo (N—N) initiator, such as AIBN; or a carbon-carbon (C—C) initiator. Activation of the initiator may occur by photochemical, thermal, or redox decomposition.

A polymerization promoter may also be utilized, usually to activate a polymerization initiator. One or more polymerization promoters may be added to one or both of the first and second compositions to activate the initiator, promoting the decomposition of the initiator as the polymer forms at or near room temperature. The promoter helps the initiator to initiate the polymerization process at or near room temperature. The promoter can be oxidized in the process. Transition metal salts, such as manganese, iron, cobalt, and copper salts, are useful promoters. Examples of cobalt metal salts include cobalt naphthenate (CoNp), cobalt octoate, and cobalt neodecanoate. Other useful promoters include persulfate salts and rare earth metal (e.g., cerium) salts.

To prevent premature initiation of the polymerization reaction, a polymerization inhibitor, such as cupferron (the ammonium salt of N-nitroso-N-phenylhydroxylamine), may also be present in either or both of the first and second compositions.

The two-stage polymer systems may be used in many applications, ranging from civil infrastructure, aerospace, automotive, and electronics applications to marine applications and the like. The chemistries of the first composition and second compositions can be tuned to the needs of the application at hand. A self-healing device, such as a polymeric material panel, plank, or plating, may be obtained by fitting the device with a first vessel containing the first composition and a second vessel containing the second composition. The vessels may be cavities in the device, such as volumes void of matrix, e.g., channels, or containers introduced in cavities of the device where restorative capabilities are desired.

For instance, a polymeric material panel may include a first set of channels and a second set of channels, where the channels are embedded in the polymer matrix. The first composition is introduced in the first set of channels, and the second set of channels is filled with the second composition. The channels are then sealed and the panel can be put to use as, for example, a component of gas-tight hulls in aircraft or other means of transportation. Alternatively, the first composition and/or the second composition may be introduced into cavities in a polymer matrix in the form of containers that are filled with a composition(s) and then placed into such cavities. Furthermore, the first composition and the second composition may be introduced to fill cavities or voids in other materials to provide a filling by delivery to a specific area by syringe, by brushing, or spraying, or other delivery method, for example, for dental applications.

A sufficient amount of damage to the panel will result in the piercing of the first set of channels and the second set of channels, leading to the establishment of fluid communication between the channels and subsequent mixing of the first composition and the second composition. In another example, the first composition may be a first fluid contained within cavities formed in a polymer matrix, and the second composition may be a second fluid that is stored in microcapsules dispersed in the first fluid.

While the micro-vascular characteristics of the invention, along with its self-healing capabilities, make it an attractive option for many applications, other embodiments can make use of the inventive 2-stage chemistry and rheological control without delivering the material by channels or capsules or having self-healing capabilities. For example, biomedical and dental applications, such as dental fillings, crowns, and other restorations, would be areas for which the invention can provide attractive solutions to problematic applications. The trigger in these other embodiments would be delivery of the 2-stage chemistry to a specific area via a syringe, caulk gun, paint brush, aerosol spray, and the like, depending on the application.

Other applications of the invention include the repair of marine pipe leaks, protective coatings for corrosion mitigation in the aerospace, automotive, and civil infrastructure industries. The invention can also be broadly used as an adhesive or filler for advanced manufacturing that requires flexible properties for processing such as for dental and/or biomedical applications. Additionally, the 2-stage chemistry is easily adapted to be compatible with most structural materials, including metals and ceramics.

Aspects of the Polymer System

In certain embodiments, the invention consists of an integrated chemical resin containing multiple reactive components. Each component is stable in a latent form until a trigger, such as a catalyst or an initiator, is introduced. Species specific chemical triggers can be used to independently initiate reactions in each of the components. Each reaction transitions the resin to a new rheological stag. For example, a two-stage resin may first transition from a liquid to a soft gel and later transition from a soft gel to a structural polymer. Changes in chemical concentrations, molecular weights, and molecular structures can dramatically modify the timescale of the reactions in a controllable, repeatable manner. The invention effectively provides rheological control over a wide range of timescales. Additionally, the invention can be applied to many different polymeric materials.

Similar to many commercial epoxy resins, the compositions described herein can be split into two separate components, commonly referred to as a first composition or "Part A" and a second composition or "Part B." The two components are stable until combined, at which point the designed transitions will begin to take place.

The polymer system may be formulated to contain a wide variety of chemical species. Desired properties and reaction kinetics can be obtained by introducing crosslinkers, changing one or more of the polymerizable monomer components, or using alternative initiators and/or types of polymerization reactions. The examples below employ three distinct reactive species to trigger two separate types of polymerization reactions at desired intervals, which correspond to three distinct physical material states (liquid, soft (flowable) gel, rigid solid).

Most commercial resins possess a single transition from a liquid to a solid. Although liquids are convenient for transportation and processes like injection molding, they are generally difficult to process since they do not retain their shape. This problem has led to the development of b-stage semi-cured resin systems that are solid at low temperatures and can be processed into different forms at higher temperatures. In contrast, the invention described herein can be designed to rapidly solidify from a liquid to an intermediate state that allows the flexibility of a liquid component and the manufacturing convenience of a b-stage resin. The intermediate state can be designed to be soft and moldable, while retaining its shape under ambient conditions. The resin systems described herein are efficient and can reduce costs and/or improve throughput by virtue of the increase in rheological control. With improved control of rheological properties, the polymer system described herein allows for the repair and restoration of damaged materials, a major advance over current technology. Conventional polymer systems cannot adequately repair and restore damaged materials due to their lack of staged rheological behavior. Restoration of materials can provide increased safety, reliability, and reduced cost for a wide variety of applications.

Conventional polymer systems generally possess a single transition, i.e., from a liquid state to a rigid state, which limits their processing capabilities. The polymer system described herein enables superior control of liquid polymer resins. By implementing the multiple stage polymerization technique described herein, a resin system can be designed and maintained in a wide range of physical/mechanical states, i.e., from a low viscosity liquid to a semi-solid gel and finally to a rigid thermoset or thermoplastic polymer. Furthermore, multiple transitions can be designed to fit sequential manufacturing or processing stages.

The invention provides fine, tunable control of mechanical properties of a material through multiple, independent transitions. Both the physical properties and the timing of transitions can be precisely controlled. The invention is adaptable across many compositions, concentrations, and molecular structures to fit a wide range of applications. The invention can be formulated to possess a low viscosity (i.e., <50 cps), while retaining a fast gel time (i.e., <1 minute) as a first transition. In contrast, commercial quick-set epoxy resins possess gel times of three minutes or more and generally have a viscosity in the range of about 10,000-50,000 cps. For example, Devcon® 5 Minute Epoxy Adhesive (ITW Devcon) has a viscosity of about 10,000-20,000 cps.

Organogels typically possess mechanical properties that are too soft for structural applications. The polymer system described herein replaces the organic solvent of a typical organogel with an organic monomer that can use a second trigger to initiate a second polymerization reaction. The invention also provides greater control over final mechanical properties suited to the application with the ability to transform an organogel into a rigid, structural polymer.

Conventional multiple component and multiple stage systems generally require direct engineering control of the system to obtain the desired composition and structure. In some cases, polymers are synthesized independently and then blended together. The invention described herein possesses each of the reactive species in its initial, latent state. Manual chemical processing is not required for the resin to proceed to each stage and additional materials or solutions do not need to be introduced to initiate reactions.

Traditional polymer systems can be generally tailored to possess different cure rates based on altering the kinetics of the reactions. However, the range of control is usually dictated by the reaction temperature. The reaction proceeds in a singular fashion from a liquid of a designed viscosity to a solid of a designed modulus. In contrast, the invention described herein displays a degree of kinetic and mechanical control significantly greater than that provided by the traditional systems. Small concentration changes can significantly alter the kinetics of reactions. Because the polymer system described herein possesses multiple reactive pathways, various stages of mechanical properties can be obtained. Intermediate stages can exist for short or extended periods and possess properties between the initial liquid and final solid. The 2-stage chemistry can be specifically formulated to obtain all of the parameters under ambient (in situ) conditions so that no control over reaction temperature is necessary to trigger the multiple stages.

Two challenges presented by traditional polymeric resins are the processing difficulties due to the resins' relatively high viscosities and their susceptibility to oxygen inhibition. The polymer system described herein overcomes these challenges. The invention can employ small acrylate monomers that result in low viscosities below about 70 cps, or below about 50 cps. The inventive polymer system can rapidly solidify (i.e., in approximately 30 seconds at room temperature) and can be designed to fully cure in a longer, yet relatively rapid, time period (i.e., in one hour at room temperature).

The invention can also counteract oxygen inhibition of free-radical initiated systems. The 2-stage chemistry described herein can be designed to possess a semi-solid stage to slow oxygen inhibition, while still allowing diffusion-dependent reactions to take place at a reasonable timescale. The formation of the first stage has been observed to protect the subsequent stage from the effects of oxygen inhibition. In situations particularly sensitive to oxygen inhibition, a thiol-containing system can be employed to retard oxygen inhibition and ensure a full cure in an aerobic environment.

The material can also shield reactive species from other environmental hazards, such as moisture, pressure, and hot or cold temperatures. The polymer system can be modified to optimize protection for applications with high sensitivity to environmental conditions.

In one particular embodiment of the invention, the polymer system consists of Gelator A, a bis-acylhydrazine functionalized poly(ethylene glycol) (PEG), Gelator B, tris[(4-formylphenoxy)methyl]ethane, gel catalyst dichloroacetic acid (DCA), thermoplastic monomer precursor 2-hydroxyethyl methacrylate (HEMA), polymer initiator methyl ethyl ketone peroxide, and polymer promoter cobalt naphthenate. These chemicals were screened and optimized for a restorative synthetic material application. The molecular weight of the polymer system was also tuned for the application. A modified version of this embodiment replaced the thermoplastic HEMA monomer precursor with a blend of thermoset monomer precursor trimethylolpropane tris(3-mercaptopropionate) (TMPTMP) and thermoset monomer precursor 1,3-glyceryl dimethacrylate (GDMA). Cupferron was added as a thermoset inhibitor in the polymer stage. See Scheme 2 in the Examples section below.

We have also investigated the use of additional organic solvents and monomer systems. A ternary reactive system can be prepared by adding additional components or functionalities to the resin to install additional transitions. Polymerization techniques other than free radical or condensation polymerization can also be used to prepare the polymer system described herein.

The final polymerized material for both thermoplastic and thermosetting polymer systems is a combination of the crosslinked gelation chemistry and the polymerized monomer. Specific examples of the crosslinked gelation chemistry and polymerized monomer are as illustrated in Scheme 1 below, but other structures can be achieved using other gelators and monomers described above and elsewhere herein.

Scheme 1. Examples of Crosslinked Gelation Chemistry and Polymers.

A. Crosslinked Gelation Chemistry:

Formula (I)

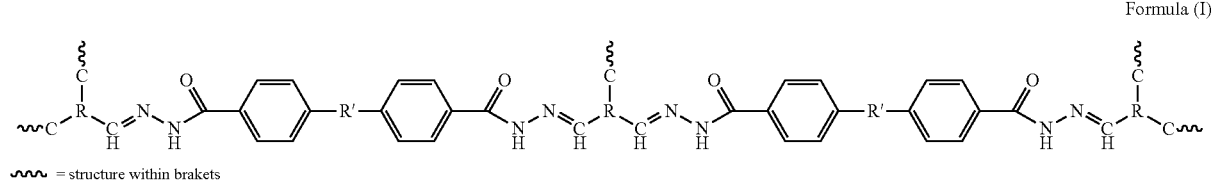

∿∿ = structure within brakets

-continued

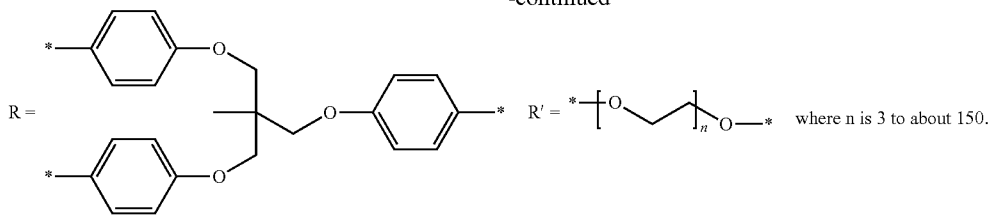

where n is 3 to about 150.

Gel Stage: Crosslinked gelation chemistry.

B1. Thermoplastic:

Formula (II)

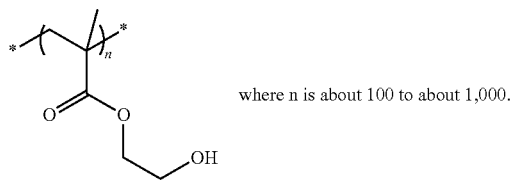

where n is about 100 to about 1,000.

Polymer Stage - Thermoplastic: poly(2-hydroxyethyl methacrylate)

B2. Thermoset:

Formula (III)

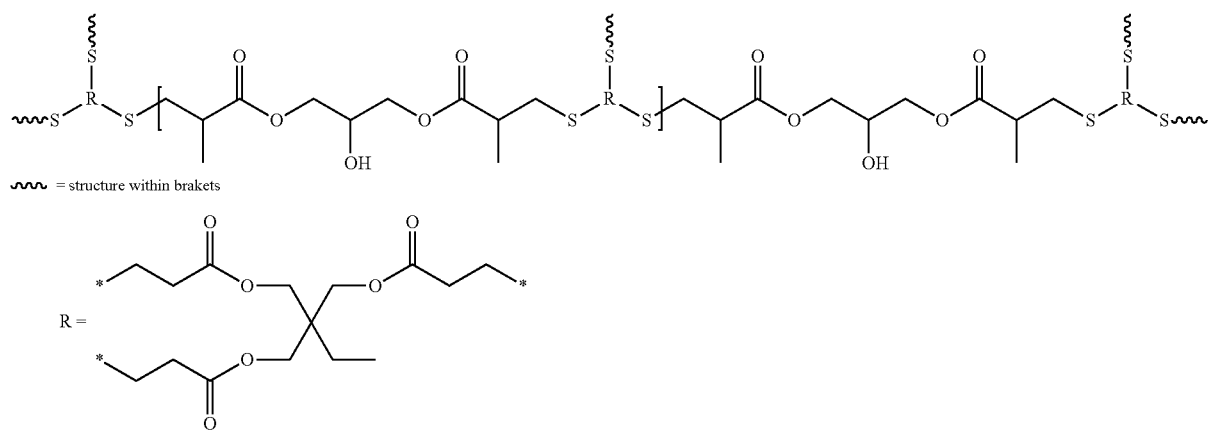

∿∿ = structure within brackets

Polymer Stage - Thermoset: thiol-ene crosslinked polymer

The polymers can have terminal groups that are hydrogen, or terminal groups derived from the promoter, initiator, or other reaction component. Hydroxyl groups can be optionally protected (e.g., with acetyl groups) and phenyl groups can be optionally substituted (e.g., with ($C_1$-$C_6$)alkyl groups, halo groups, etc.).

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated.

The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discussed above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products such as a gel or polymer in a reaction mixture. Thus, an "effective amount" generally means an amount that provides the desired effect.

The term "polymeric" means a substance that includes a polymer.

As used herein, the term "polymer" refers to a substance containing more than 100 repeat units. The term "polymer" includes soluble and/or fusible molecules having chains of repeat units, and also includes soluble, insoluble, and infusible networks. The term "prepolymer" refers to a substance containing less than 100 repeat units and that can undergo further reaction to form a polymer.

The term "gel" means a jelly-like material that can have properties ranging from soft and weak to hard and tough. It is composed of at least two components, one of which is a polymer that forms a three-dimensional network by bonding in the medium of the other component, which is a liquid, wherein the minimum amount of liquid is sufficient to ensure the elastic properties of the gel. Gels are a substantially dilute cross-linked system, which exhibits no flow when in the steady-state. By weight, gels are mostly liquid, yet they behave like solids due to a three-dimensional cross-linked network within the liquid. It is the crosslinks within the fluid that give a gel its structure (hardness) and contribute to stickiness (tack). In this way gels are a dispersion of molecules or particles within a liquid in which the solid is the continuous phase and the liquid is the discontinuous phase.

The term "gelator" refers to monomeric subunits that form self-assembled fibrillar networks that entrap solvent between strands of the network. The self-assembled fibrillar networks arise from the formation of strong non-covalent interactions between gelator monomeric subunits. As the networks form, the developing strands and fibers become intertwined and trap solvent molecules, and the solvent molecules are immobilized by surface tension effects. The stability of a gel is determined by the equilibrium between the assembled network and the dissolved gelators.

The term "Mn" means the number average molar mass of a polymer, which is the mass referred to herein, unless otherwise specified, or unless the context dictates otherwise.

The term "matrix" means a continuous phase in a material, such as a polymer or polymer composition.

The term "matrix precursor" means a composition that will form a polymer matrix when it is solidified. A matrix precursor may include a prepolymer, such as a monomer precursor, that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

The term "gelation catalyst" means a substance capable of increasing the rate of a gelation reaction without itself undergoing any permanent chemical change.

The term "polymerization initiator" means a substance capable of starting or accelerating a polymerization reaction.

The term "polymerization promoter" means a substance capable of encouraging a polymerization reaction. The polymerization promoter is usually consumed partly or fully during the polymerization reaction. A polymerization promoter can activate a polymerization initiator.

The term "polymerization inhibitor" means a substance capable of impeding a polymerization reaction.

The term "fluid communication" means that two objects are in an orientation, and within a sufficient proximity to each other, such that fluid can flow from one object to the other. The term "fluid" means a substance in the liquid or gaseous state. In one example, if a channel embedded in a matrix is in fluid communication with a surface of the matrix, then fluid can flow from the channel onto the surface of the matrix.

The term "acrylate" means a salt, ester, or conjugate base of acrylic acid and its derivatives. Typical acrylate monomer precursors used to form acrylate polymers are based on the structure of acrylic acid, which includes a vinyl group and a carboxylic acid terminus. Other typical acrylate monomer precursors are derivatives of acrylic acid, such as methyl methacrylate, in which one vinyl hydrogen and the carboxylic acid hydrogen are each replaced by methyl groups, and acrylonitrile, in which the carboxylic acid group is replaced by the related nitrile group.

The term "acidity" means the level of acid in substances, such as water or an organic solvent. In aqueous solutions, acidity may be expressed in terms of pH.

The term "self-healing" refers to the ability to repair damage and restore lost or degraded properties or performance using resources inherently available to the system. A self-healing process may be triggered by chemical, physical or other human means, or it may be automatic (i.e., self-healing that occurs automatically without human intervention).

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Multiple Stage Curable Polymer with Controlled Transitions

FIG. 1A illustrates an example where the first composition is a first polymer precursor solution (a combination of Gelator A, a gel catalyst, and a promoter) contained in a first vessel (represented by the left circle) and the second composition is a second reactive polymer precursor solution (a combination of Gelator B, an initiator, and a monomer) contained in a second vessel (represented by the right circle). The first and second polymer precursor solutions begin as stable, low viscosity sols until a mixing event, such as damage to the area separating the solutions creating a volume void due to mass loss, triggers release into a region at time "$t_0$", allowing for combination of the first and second solutions, initiating their reaction (FIG. 1B). A relatively fast gel stage takes place beginning at time "$t_1$", creating a semi-solid scaffold (Gel Stage) upon which additional solution is accreted. Gelator A, a bis-acylhydrazine terminated poly(ethylene glycol) and Gelator B, a tris[(4-formylphenoxy) methyl]ethane, form a cross-linked network of dynamic acylhydrazone bonds by acid-catalyzed condensation. This chemistry is capable of gelling a wide range of organic liquids, including solvent-free acrylic and thiol-ene monomer precursors.

Deposition of fluid and subsequent gelation continues until the void is filled (third panel of FIG. 1B). While gelation accomplishes the need to fill gaps stemming from the mass loss, conversion to polymer, for example, by radical polymerization, completes the restorative process. At time $t_2$, the polymer stage follows as bulk polymerization of monomer using a two-component initiation system, and structural performance is recovered. Chemical syntheses and structures of examples of the two-stage resin system are given in Scheme 3 below.

The properties of the structural polymer are tailored by selection of the monomer, as demonstrated below in two examples. In one example, a thermoplastic material was formed by polymerization of 2-hydroxyethyl methacrylate (HEMA) initiated by a redox reaction between methyl ethyl ketone peroxide (MEKP) initiator and cobalt naphthenate (CoNp) promoter; in a second example, liquid thiol-ene precursors 1,3-glyceryl dimethacrylate and trimethylolpropane tris(3-mercaptopropionate) reacted to form a thermosetting material (Scheme 2).

Scheme 2. Examples of Gel, Polymer, and Monomer System Components.

GEL CHEMISTRY

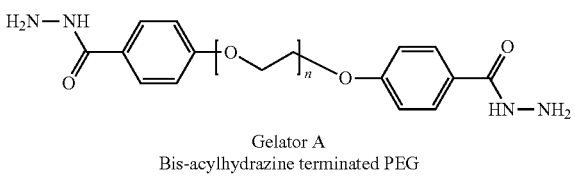

Gelator A
Bis-acylhydrazine terminated PEG

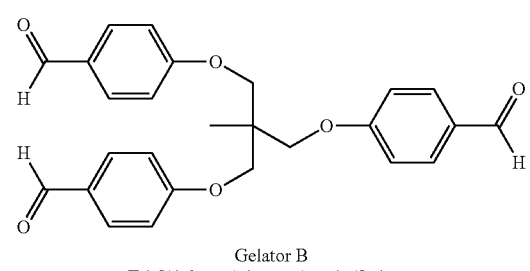

Gelator B
Tris[(4-formylphenoxy)methyl]ethane

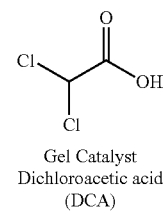

Gel Catalyst
Dichloroacetic acid
(DCA)

-continued
POLYMER CHEMISTRY

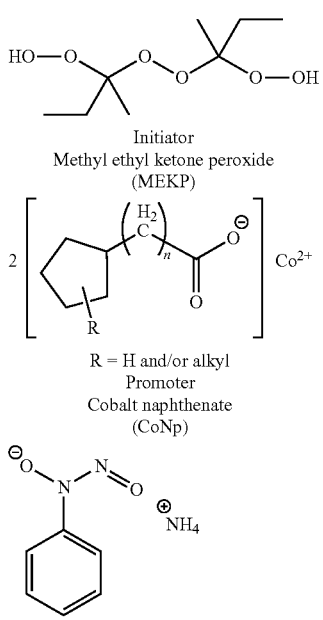

Initiator
Methyl ethyl ketone peroxide
(MEKP)

Promoter
Cobalt naphthenate
(CoNp)

R = H and/or alkyl

Thermost inhibitor
Cupferron

MONOMER SYSTEMS

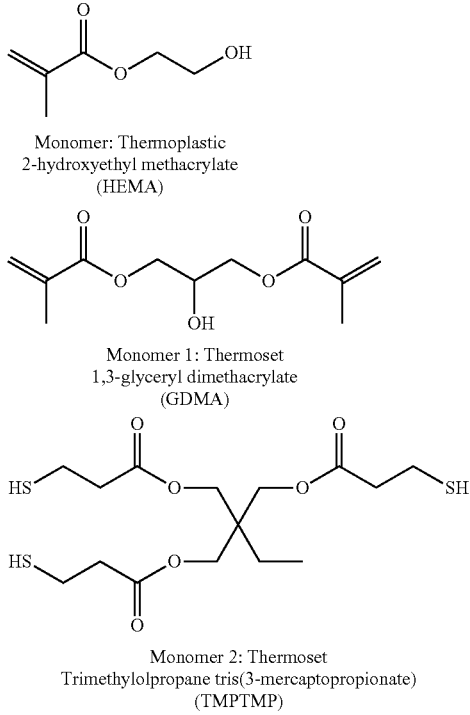

Monomer: Thermoplastic
2-hydroxyethyl methacrylate
(HEMA)

Monomer 1: Thermoset
1,3-glyceryl dimethacrylate
(GDMA)

Monomer 2: Thermoset
Trimethylolpropane tris(3-mercaptopropionate)
(TMPTMP)

The reagents required for each example were mutually compatible with the reagents for gelation chemistry. Independently, tunable chemical triggers selectively controlled the rates of both gelation and polymerization. The components for both examples were divided into two stable solutions and loaded into separate microchannels (FIG. 1A) in preparation for damage-triggered release and restoration.

Figure 2:
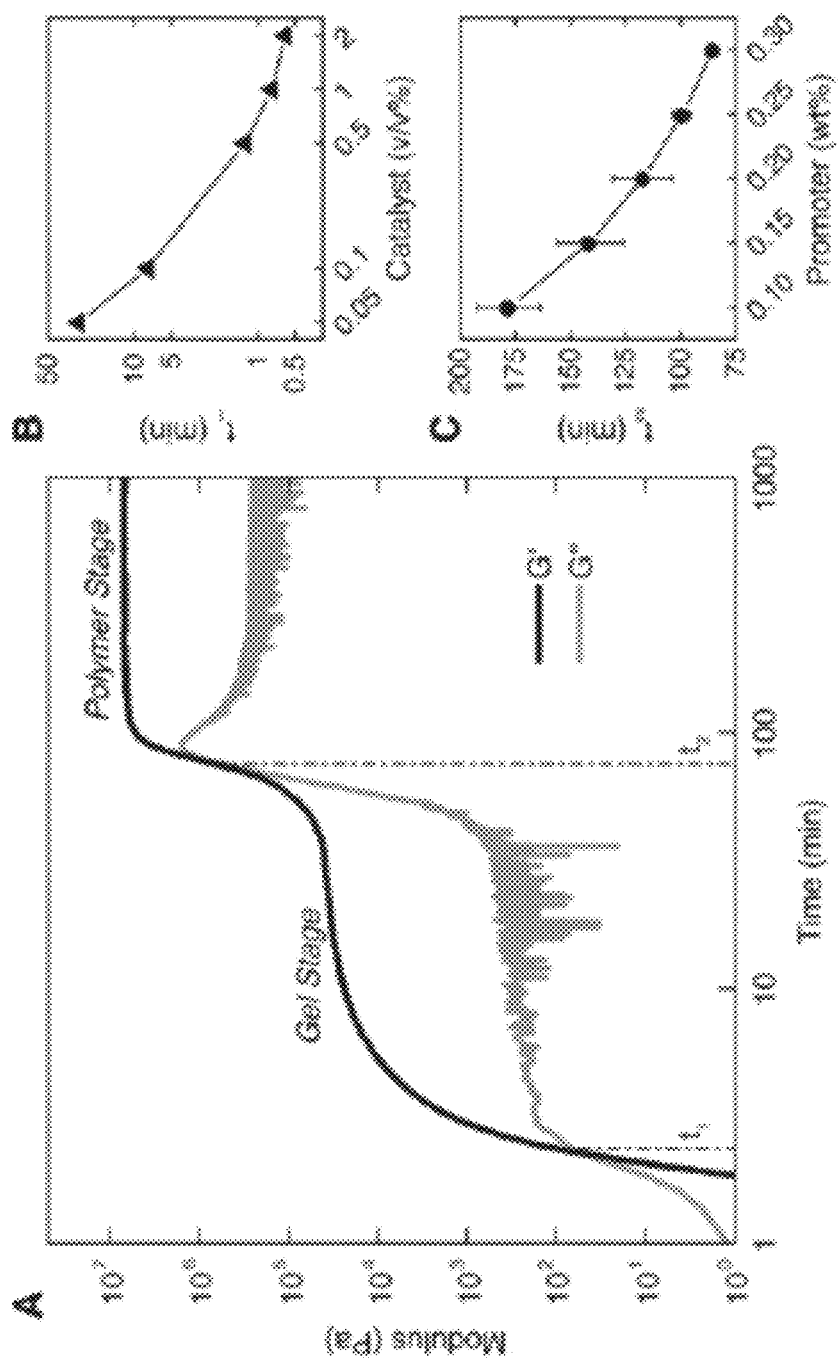
FIG. 2. Characterization of a two-stage restoration chemistry, according to an embodiment. Solutions can contain gelators in 2-hydroxyethyl methacrylate (HEMA) (monomer) with dichloroacetic acid (catalyst), methyl ethyl ketone peroxide (MEKP) (initiator), and cobalt naphthenate (promoter). (A) Rheological properties of restorative reagents over time display both fast formation of an organogel ($t_1$) and slower formation of a polymer ($t_2$) controlled by the concentrations of chemical triggers. (B) Control of gel stage kinetics by varying catalyst concentration (1.5 wt % initiator, 0.1 wt % promoter). (C) Control of polymer stage kinetics by varying promoter (2 v/v % catalyst, 1.5 wt % initiator). (D) Volume deposited using restorative gel chemistry (HEMA gel, 2 v/v % catalyst, no initiator or promoter). Tate's Law describes the limiting volume of a non-reactive fluid that can be retained by surface tension; standard test fluids confirm this relationship (①pentane, ②HEMA, ③dimethyl sulfoxide, ④ethylene glycol, ⑤glycerol, ⑥water). Restorative chemistry exceeds this limit, but deposition is dependent on the concentration of gelators. The inset optical image on the left shows the volume deposited by 12 wt % gelators, while the inset optical image on the right shows water test fluid. Scale bars=5 mm.
Figure 2:
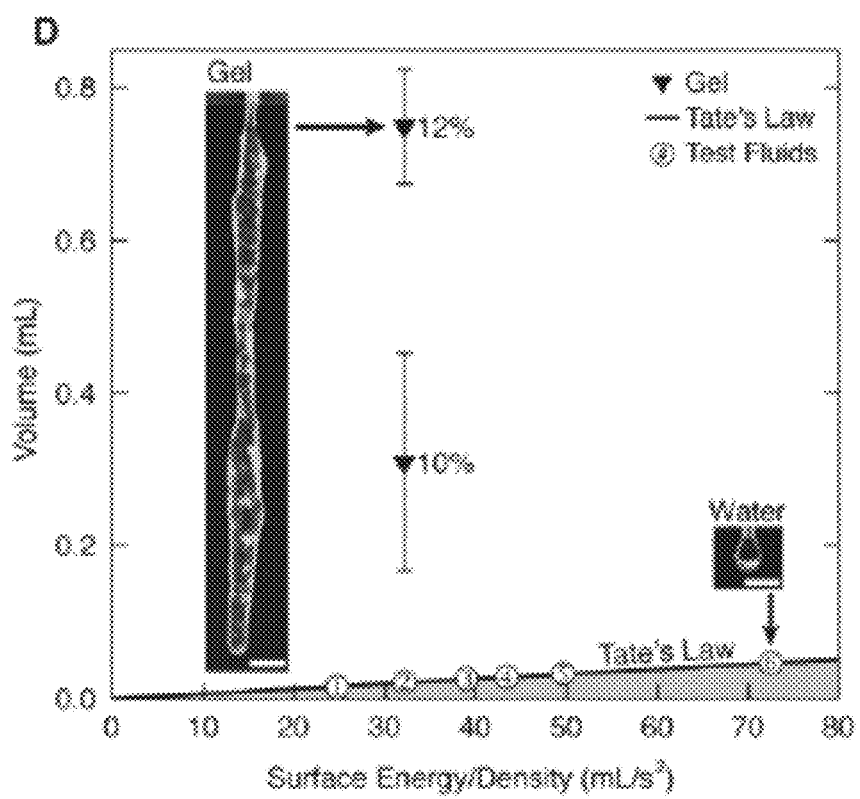

Oscillatory rheology confirmed the independent occurrence of the gelation and polymerization stages as well as the ability to regulate the reaction kinetics of each stage. FIG. 2 illustrates the characterization of a two-stage restorative chemistry based on the "HEMA example", solutions containing gelators in 2-hydroxyethyl methacrylate (HEMA, monomer precursor) with dichloroacetic acid (gelation catalyst), methyl ethyl ketone peroxide (MEKP) (polymerization initiator) and cobalt naphthenate (polymerization promoter).

As illustrated in FIG. 2A, rheological properties of the restorative reagents over time displayed both fast formation of the organogel ($t_1$), and slower reaction rate of polymerization ($t_2$), controlled by the concentrations of chemical triggers. FIG. 2A shows the evolution of storage (G') and loss (G") moduli of a 12 wt % gelator solution in HEMA. The first plateau of G' reflects monomer gelation to an about $10^4$-$10^5$ Pa semi-solid. Onset of the gel stage ($t_1$) was defined as the crossover of G' and G". The second modulus plateau, several orders of magnitude higher, reflects a slower transformation from gel to structural polymer. Polymerization onset ($t_2$) was designated as the peak of tan delta (tan d=G"/G').

Rates of gelation and polymerization were independently controlled by varying the concentrations of catalyst for the gelation reaction and concentrations of the initiator for the polymerization reaction, and plotting the time scales of staged transitions for the HEMA example. FIG. 2B illustrates control of gel stage kinetics by varying catalyst concentration at fixed initiator (1.5 wt %) and promoter (0.1 wt %) concentrations. FIG. 2C illustrates control of polymer stage kinetics by varying promoter concentration at fixed catalyst (2 v/v %) and initiator (1.5 wt %) concentrations. As seen in FIG. 2B, the gelation rate was dependent on catalyst concentration and determined the scaffold forming ability.

Figure 5:
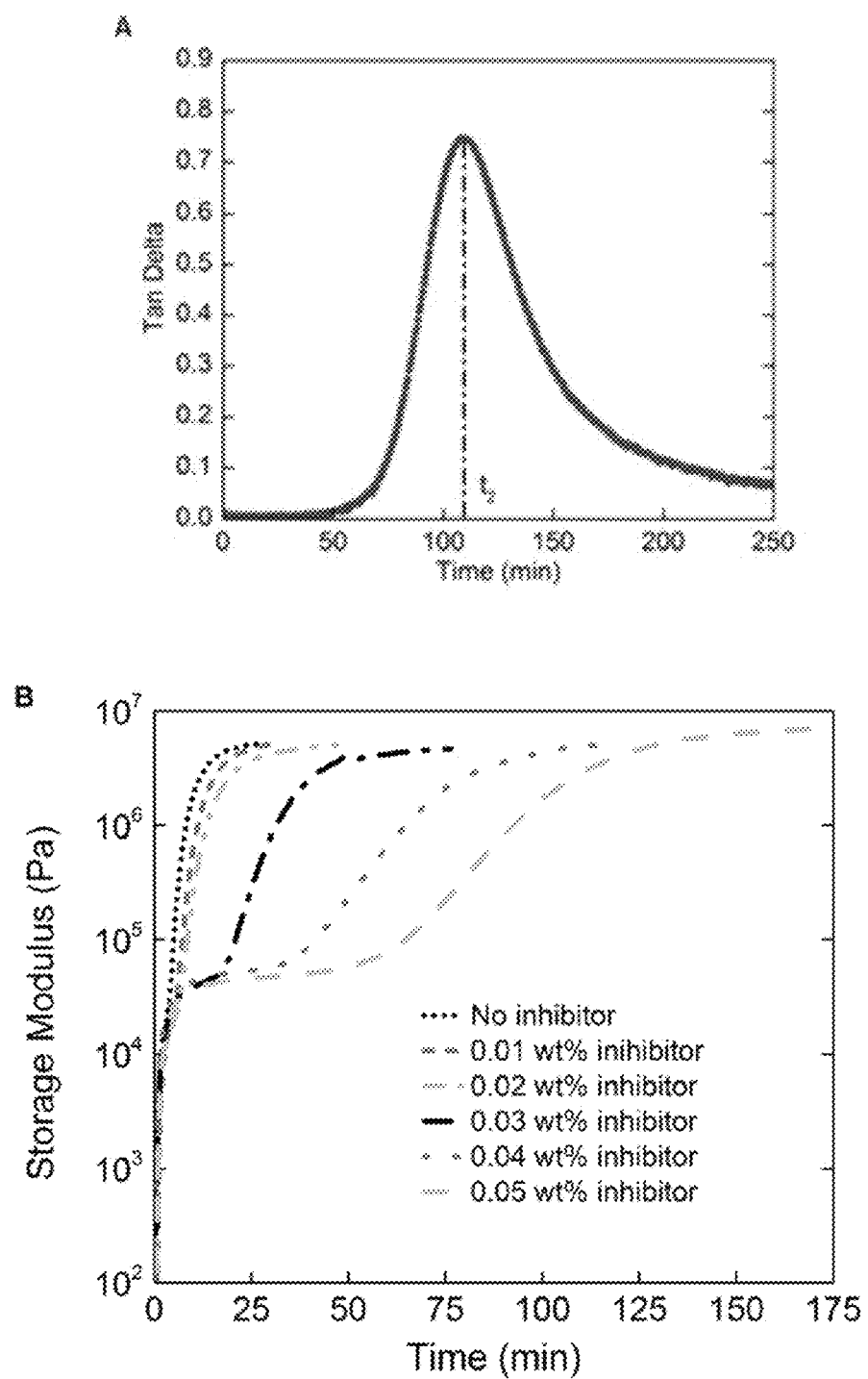
FIG. 5. Rheological characterization of materials, according to one embodiment. (A) Polymer stage onset determined by the peak of tan delta (tan $\delta$=G"/G'). (B) Rheology series for controlled thiol-ene polymerizations showing control of polymerization kinetics by changing inhibitor concentration.

The unique ability to tune the rates of the two-stage restorative system enables adaptation to a wide variety of damage geometries. As seen in FIG. 2C, control of polymerization was achieved by varying promoter concentration in an inert environment (FIG. 2C). However, the radical polymerization chain reactions were sensitive to atmospheric oxygen. In contrast, the thiol-ene thermoset chemistry was oxygen-tolerant and cured in aerobic environments. Thiol-ene polymerizations are fast and known to cure without the use of initiators. To allow sufficient time for gel formation, the radical inhibitor cupferron was used to lower the polymerization rate (FIG. 5B).

Gelation allowed for deposition of material beyond that which is dictated by surface tension alone. When damage size exceeds a certain threshold, surface tension is insufficient to retain unreacted fluid and gravity pulls it out of the damage zone. The boundary between surface tension and gravity-dominated regimes of a non-reactive fluid (described by Tate's Law and the drop-weight method of analysis, FIG. 6) was validated in an experimental set-up with standard, non-reactive, test fluids: (1) pentane, (2) HEMA, (3) dimethyl sulfoxide, (4) ethylene glycol, (5) glycerol, (6) water), as illustrated in FIG. 2D.

In contrast to these non-reactive fluids, the formulations tested in the experiment proved capable of exceeding the deposition volume expected from Tate's Law by over an order of magnitude. Two formulations (both containing HEMA gel, 2 v/v % catalyst, and no initiator or promoter) containing different gel fractions are plotted in FIG. 2D, with the greater gel fraction producing a larger deposition volume. The increase in volume retained over non-reactive fluids was due to the mechanical support of the in situ formed gel. If gelation and deposition occur on a similar time scale, the growing material is no longer retained by the surface tension of the fluid alone; it is also retained by the cohesion of the restorative material and its adhesion to the deposition surface. As seen in FIG. 2D, restorative chemistry far exceeds the limit set by Tate's law, however, deposition is dependent on the concentration of gelators. The inset optical image on the left of FIG. 2D shows the volume deposited by 12 wt % gelators, while the inset optical image on the right shows water test fluid.

Figure 3:
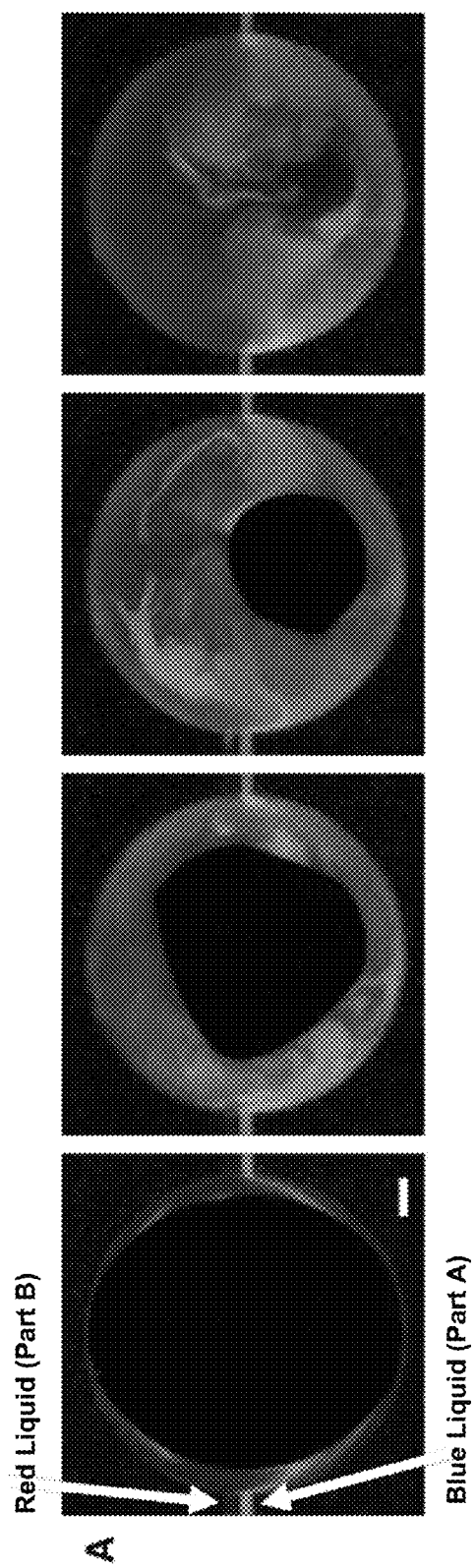
FIG. 3. Circular damage geometry restoration performance, according to an embodiment. (A) Optical images with ultraviolet illumination of 7.5 mm diameter circular damage geometry after 1, 3, 7, and 13 minutes pressurized delivery of HEMA gel solutions (2 v/v % catalyst, no initiator or promoter). Blue liquid is Part A [HEMA, Gelator A (61% of total Gel A), DCA catalyst] dyed with perylene; red liquid is Part B [HEMA, Gelator A (39% of total Gel A), Gelator B] dyed with Nile Red. Scale bar=1 mm. (B) Fill performance achieved for cylindrical damage regions of increasing size for HEMA gel and a non-gelling neat HEMA control. Area Fill Ratio (AFR)=$A_{Fill}/A_0$. (C) Restoration performance of various healing systems after a 24 h room temperature cure with the curing atmosphere indicated in the legend. Samples were subjected to 345 kPa $N_2$ pressure loading. Full restoration requires both superior fill performance and return of full mechanical function.
Figure 3:
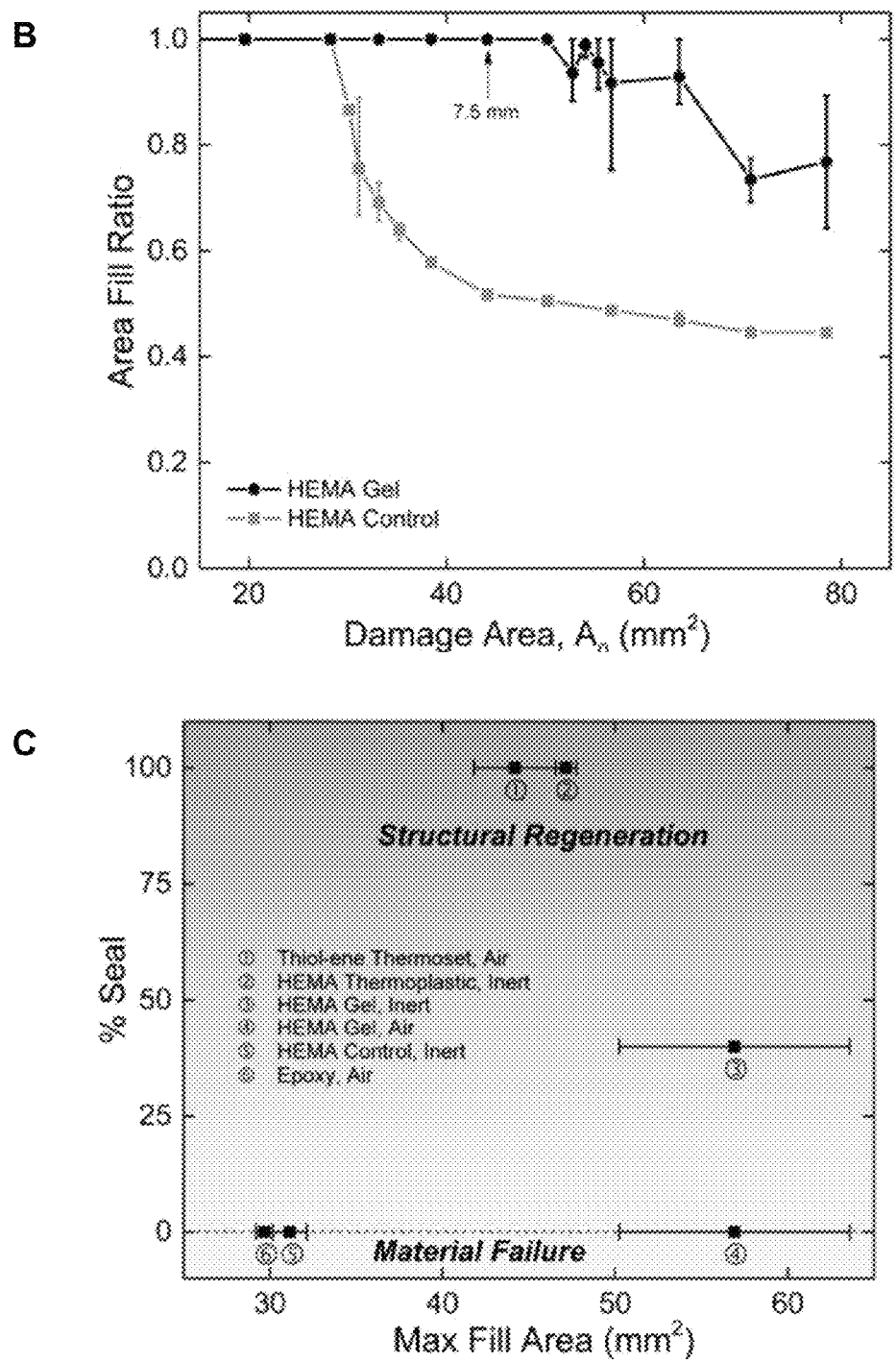

The restorative reagents spanned gaps and filled large damage volumes by forming a free-standing, dynamic scaffold upon which continued material growth occurred. An open, cylindrical damage geometry was used (FIG. 7A) as a model geometry to test the filling of large scale damage in thin epoxy sheets. Solutions of HEMA containing gelators, acid catalyst and fluorescent dye (Nile Red and perylene) were delivered to the damage area via separate microchannels (FIG. 3A). A computer-controlled, pressurized system ensured reagents were delivered at stoichiometric, 1:1 volume ratios (see Materials and Methods below). Upon entering the damaged region, the components mixed and rapidly wetted the inner surface of the sample due to their low viscosity and a low fluid-substrate contact angle (see Table 1).

TABLE 1

Contact angles of restorative chemistry on various coatings.

| Fluid | Coating | Contact Angle (°) |
|---|---|---|
| HEMA | None | 18.4 ± 7.6 |
| HEMA | Frekote ® | 82.3 ± 1.7 |
| HEMA | Ultra-Ever Dry ® | 163.0 ± 11.2 |
| Thermoset Polymer Solution A | Ultra-Ever Dry ® | 164.4 ± 8.0 |
| Thermoset Polymer Solution B | Ultra-Ever Dry ® | 158.1 ± 8.8 |
| Epoxy Resin (Epon 8132) | Ultra-Ever Dry ® | 151.2 ± 6.9 |
| Epoxy Curing Agent (Epikure 3046) | Ultra-Ever Dry ® | 121.5 ± 25.0 |

FIG. 3A includes optical images with ultraviolet illumination of 7.5 mm diameter circular damage geometry after 1, 3, 7, and 13 minutes pressurized delivery of HEMA gel solutions (2 v/v % catalyst, no initiator or promoter). A blue liquid is Part A [HEMA, Gelator A (61 wt % of total Gel A), DCA catalyst] dyed with perylene, red liquid is Part B [HEMA, Gelator A (39 wt % of total Gel A), Gelator B] dyed with Nile Red. The images show that rapid gelation formed a solid scaffold upon which additional resin from the microvascular channels was deposited. The faceted appearance of the recovering damage region (FIG. 3A) reflected the mechanical stiffness of the developing gel since an ideal liquid would assume a smooth circular shape to minimize surface tension. Gelled material grew inward and the entire damaged region was filled as the process of deposition and gelation continued. The dynamic nature of the gelator chemistry enabled continuous (defect free) gel interfaces and the formation of a monolithic plug in place of the original void.

Restoration to full mechanical function was accomplished by replenishing lost mass and transforming the gelled monomer to a fully polymerized solid. FIG. 3B illustrates fill performance achieved for cylindrical damage regions of increasing size for HEMA gel and a non-gelling neat HEMA control, where the filling performance of gelling and non-gelling controls were compared for increasing the damage area. The "area fill ratio" (AFR=$A_{Fill}/A_0$) was calculated for each damage area as the ratio of area filled by the restorative solutions to the total damage area. The control solutions achieved an AFR of 1 for diameters up to 6.3 mm. For larger diameters, the effect of gravity dominated surface tension and caused the controls to drip out of the damaged region, which resulted in incomplete filling. In contrast, gelling solutions filled to capacity (AFR=1) for damage diameters up to 9.0 mm by overcoming gravity and circumventing failure by dripping. Damage sizes exceeding 8.0 mm did not reliably fill for all replicates because gravity caused gel material to grow downward, rather than towards the damage center; however, the AFR remained significantly higher than the control solutions due to superior material retention.

Figure 7:
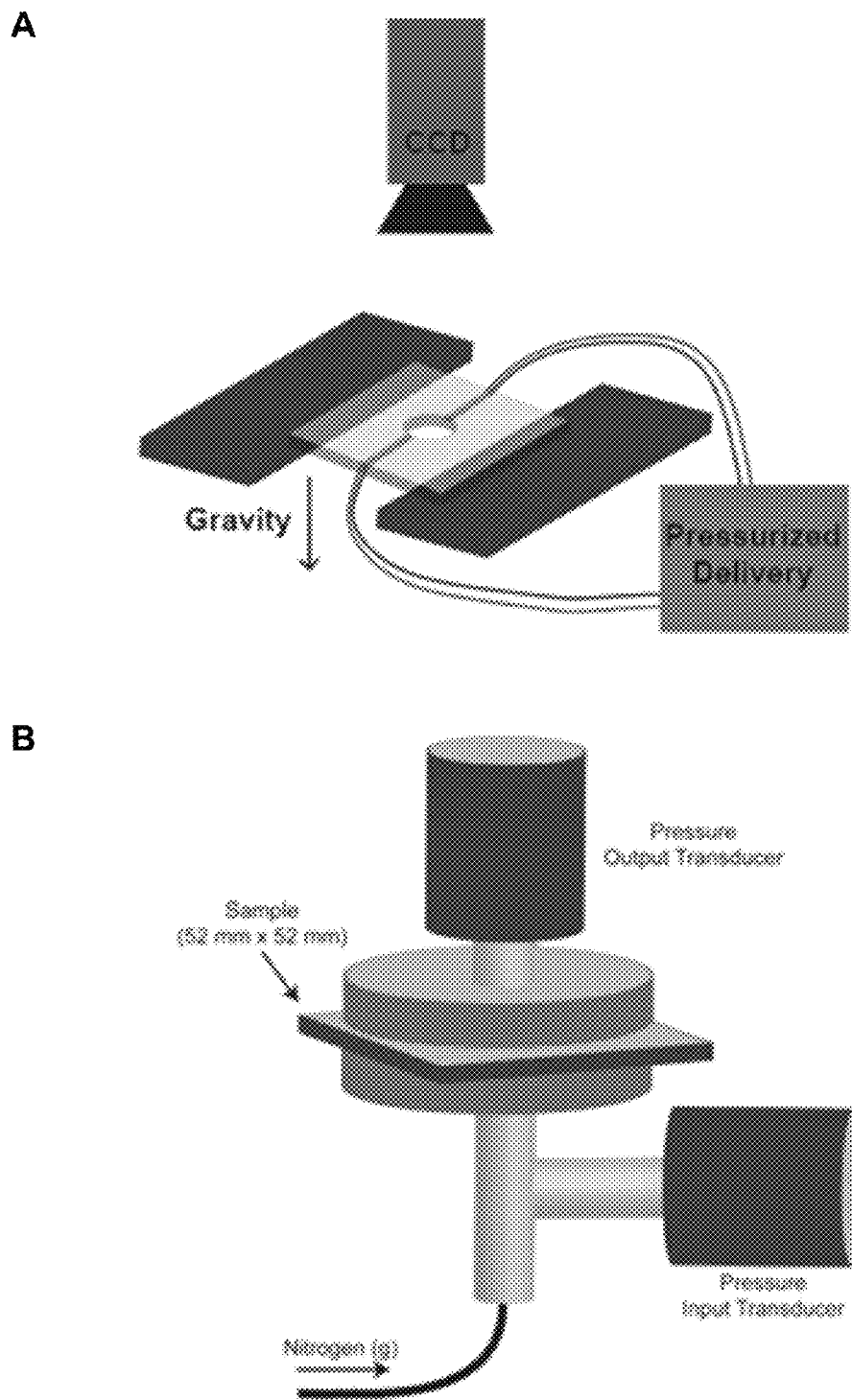
FIG. 7. A restoration experiment setup, according to one embodiment. (A) Samples are affixed horizontally. Resin components are delivered through parallel channels using pressurized delivery. (B) Pressure cell for structural recovery tests.

Restoration achieved both superior fill performance and return of full mechanical function. FIG. 3C illustrates restoration performance of various healing systems after a 24 hour room temperature cure with the curing atmosphere indicated in the legend. Samples were subjected to 345 kPa $N_2$ pressure loading. A pressure cell was used to verify mechanical recovery of the system by applying 345 kPa of nitrogen to one side of a damaged sample and monitoring leakage on the opposite side (FIG. 7B). Since only a completely filled damage region will withstand pressurization, the maximum damage areas were tested at which each restorative system attained complete filling for each of 5 replicates. All gelling systems were able to fill larger damage areas than the non-gelling solutions, but they did not provide mechanical recovery without a second transition to polymer. Only the thermoplastic and thermoset two-stage polymers combined both filling performance with mechanical recovery to achieve true restoration. A standard two-part epoxy resin was presented for comparison and could neither fill a significant damage area, nor seal after a 24 hour room temperature cure. As demonstrated by larger area fill ratios and higher seal rates, two-stage polymers provided restorative performance superior to traditional healing chemistries.

Figure 4:
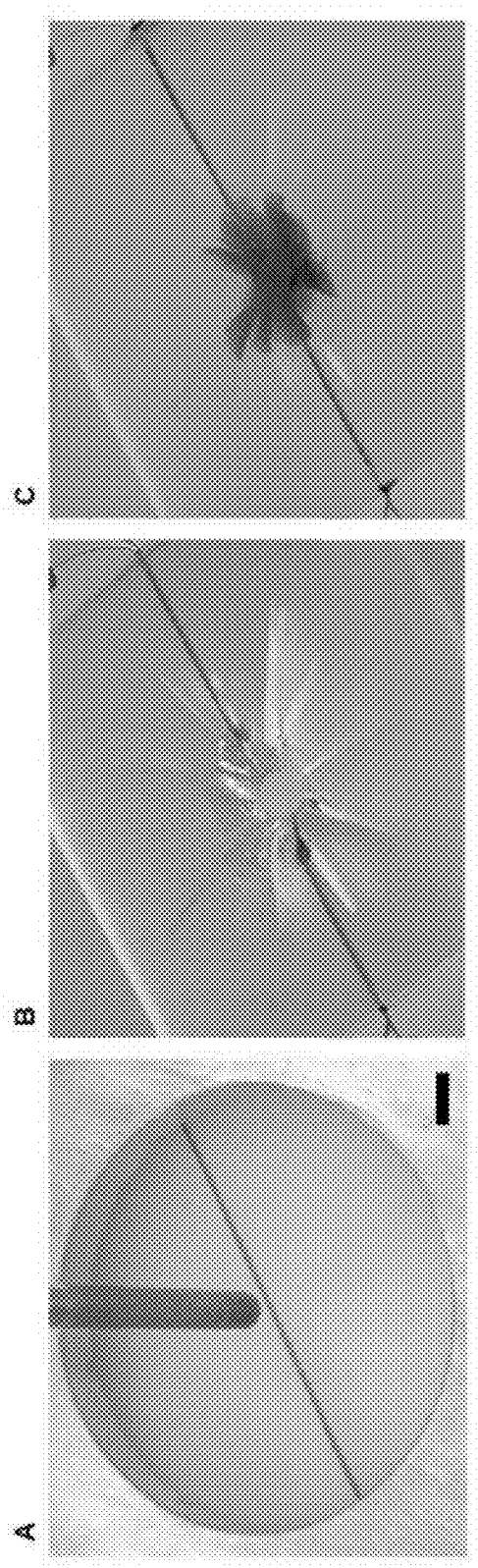
FIG. 4. Restoration of impact damage, according to an embodiment. Perspective views of impact specimen restored with poly(HEMA) two-stage system (0.1 v/v % catalyst, 1.5 wt % initiator, 0.1 wt % promoter). Both components of two-part solutions are dyed and recolored in images for visualization. (A) Specimen mounted into impact test fixture; 4 mm hemispherical impact tup is suspended over specimen. (B) Impact damage with central puncture and radiating cracks, before filling; and (C) after filling. Scale bar=5 mm.

To test the restorative scheme in realistic damage modes, specimens were impacted and punctured using a drop tower apparatus. Both components of two-part solutions were dyed and recolored in images for visualization. The multi-scale damage present in impact specimens represented a significant challenge for restoration and required chemistry that could both replace the lost mass, as well as penetrate into micro-cracks to create a pressure tight seal. A specimen was mounted into an impact text fixture, an impactor with a hemi-spherically shaped tip 4 mm in width was dropped at 6.26 J (FIG. 4A), creating a central puncture and radiating cracks with damage spanning approximately 35 mm in diameter (FIG. 4B). The pressurized delivery scheme disclosed above was implemented to fill the damage post-impact with a poly(HEMA) two-stage system (0.1 v/v % catalyst, 1.5 wt % initiator, 0.1 wt % promoter). A dye (Oil Blue N) was used to observe the deposition process, which included wicking into the radiating cracks (FIG. 4C). By tuning the gelation kinetics, gap-filling and partial penetration of radial micro-cracks emanating from the central hole were achieved. Pressure testing of impact samples yielded about 60% sealing success, with most failures being attributed to the lack of sealing of the dense network of micro-cracks.

Materials and Methods

Chemical Syntheses and Characterizations

Unless otherwise stated, all starting materials were obtained from commercial suppliers and used without further purification. $^1$H NMR spectra were obtained with a Varian 400 or Varian 500 MHz spectrometer. Chemical shifts are reported in δ (ppm) relative to the residual solvent peak. Splitting patterns are designated as s (singlet), d (doublet), t (triplet), dd (doublet of doublets), m (multiplet), and br (broad).

MALDI-TOF mass spectra were obtained with a Bruker Daltonics UltrafleXtreme MALDI-TOF. The ions were accelerated under a potential of 20 kV and an external mass calibration was used (PEG 1500, Sigma-Aldrich). Samples were prepared from a polymer sample (1 mg/mL in 1:1 (v/v) acetonitrile:water with 1% trifluoroacetic acid) and a matrix solution 4-hydroxy-α-cyanocinnamic acid (CCA, at 10 mg/mL in 1:1 (v/v) acetonitrile:water with 1% trifluoroacetic acid).

Gelators A and B were synthesized by the procedures known to those of skill in the art, for example, as illustrated in Scheme 3 (synthesis of Gelator A and Gelator B; A: synthesis of Gelator A showing intermediate compound 1, mesylate-terminated poly(ethylene glycol), and compound 2, methyl benzoate-terminated poly(ethylene glycol); B: synthesis of Gelator B showing intermediate compound 3, tris[(4-tolylsulfonyl)methyl]ethane).

MHz, $CDCl_3$) δ 4.42 (t, 4H), 3.89 (t, 4H), 3.89-3.78 (m, $CH_2$ PEG), 3.09 (s, 6H, $CH_3$ mesyl). HRMS (m/z): $[M+Li]^+$ calculated for $C_{50}H_{102}O_{29}S_2Li$, 1237.611. found, 1237.027.

Methyl benzoate-terminated poly(ethylene glycol) (Compound 2)

Compound 1 (74 g, 0.062 mol), methyl 4-hydroxybenzoate (0.19 mol) and potassium carbonate (0.37 mol) were refluxed in acetone overnight. The solution was condensed and diluted with water, extracted with DCM, and dried over $MgSO_4$. Product solution was concentrated and precipitated in ethyl ether. A white product was collected and dried to give Compound 2, 99% functionalized (69.6 g, 86%). $^1$H NMR (400 MHz, $CDCl_3$) δ 7.98 (d, 4H, aromatic), 6.93 (d, 4H, aromatic), 4.17 (t, 4H), 3.88-3.86 (m, $CH_3$ benzoate, PEG), 3.73-3.59 (m, $CH_2$ PEG). HRMS (m/z): $[M+K]^+$ calculated for $C_{64}H_{110}O_{29}K$, 1381.677. found, 1381.787.

Scheme 3. Examples of the preparation of Gelator A and Gelator B.

A

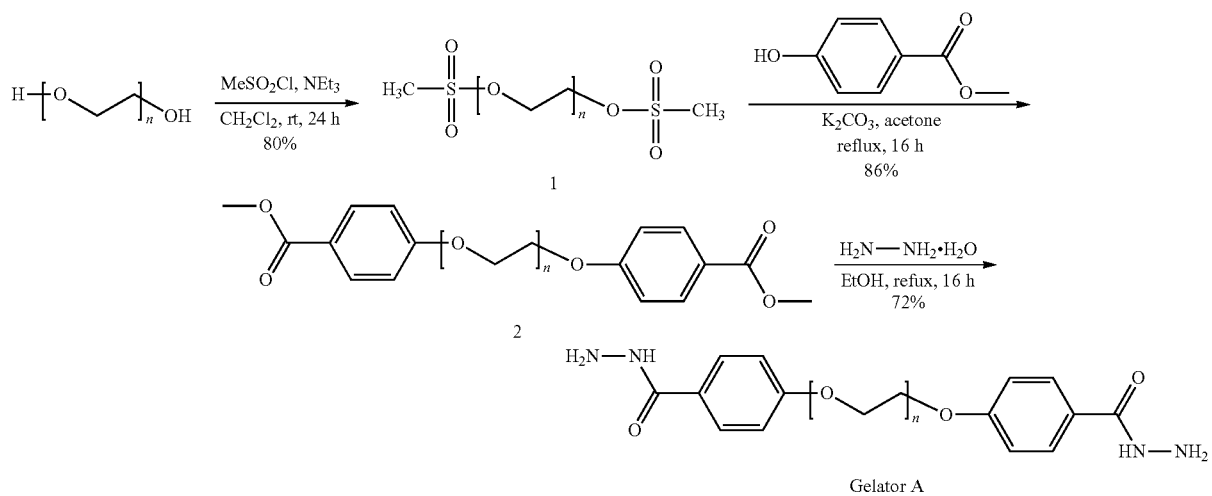

B

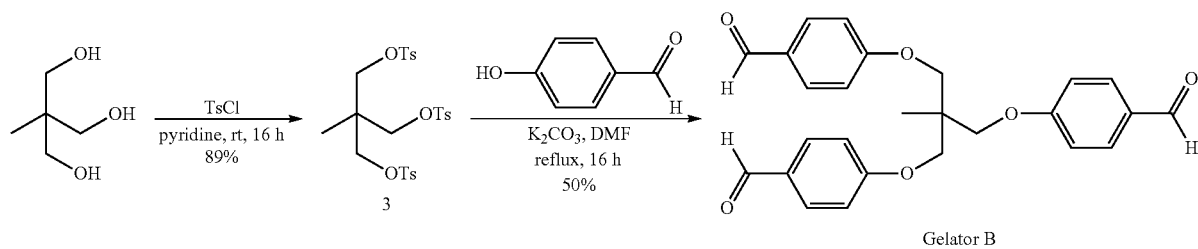

Mesylate-terminated poly(ethylene glycol) (Compound 1)

Poly(ethylene glycol) (Mn=1000 Da) (80 g, 0.08 mol) was azeotropically dried in benzene, dissolved in dry DCM and charged with triethylamine (0.8 mol) under nitrogen. The solution was cooled to 0° C. and methanesulfonyl chloride (0.8 mol) was added dropwise. After stirring at room temperature for 24 hours, the solution was filtered to remove the precipitate and diluted with water. The solution was extracted with DCM and washed with 1 M HCl and brine. Product solution was then dried over $MgSO_4$ and condensed in vacuo. The concentrated oil was next precipitated by dropwise addition into cold ethyl ether. A light yellow product was collected and dried to give Compound 1, 98-99% functionalized (76.0 g, 80%). $^1$H NMR (500

Bis-acylhydrazine-terminated poly(ethylene glycol) (Gelator A)

Compound 2 (68 g, 0.052 mol) was dissolved in EtOH with heating. Hydrazine hydrate solution, 80% in water (4.66 mol) was added and the solution refluxed for 16 hours. The solution was condensed and diluted with water, extracted with DCM and washed with 1:1 water:brine. The organic layer was dried over $Na_2SO_4$, condensed and precipitated in ethyl ether. A white product was collected and dried to give Gelator A, 96% funct., 93-94% overall functionalization (49 g, 72%). $^1$H NMR (400 MHz, DMSO) δ 9.61 (s, 2H, NH), 7.79 (d, 4H, aromatic), 6.99 (d, 4H, aromatic), 4.46 (br s, 4H, $NH_2$), 4.13 (t, 4H), 3.74 (t, 4H), 3.60-3.46 (m, PEG). HRMS (m/z): [M+Na]+ calculated for C62H110O27N4Na, 1365.726. found, 1365.767.

Percent functionalization for Compounds 1 and 2 were determined by relative abundance of parent peaks in the MALDI-TOF spectra. Final functionalization of Gelator A was determined by comparing peak areas according to literature procedure (Beaufort et al., *Tetrahedron* 63, 7003 (2007)).

Tris[(4-tolylsulfonyl)methyl]ethane (Compound 3) was synthesized following a literature procedure. $^1$H NMR (500 MHz, CDCl$_3$) δ 7.72 (d, 6H, aromatic), 7.37 (d, 6H, aromatic), 3.76 (s, 6H, CH$_2$), 2.47 (s, 9H, CH$_3$ tosyl), 0.89 (s, 3H, CH$_3$ head of the bridge).

Tris[(4-formylphenoxy)methyl]ethane (Gelator B)

Compound 3 (4 g, 6.87 mmol), 4-hydroxybenzaldehyde (27.46 mmol) and potassium carbonate (27.46 mmol) were dissolved in DMF and refluxed under nitrogen overnight. The solution was concentrated and diluted with water, extracted with EtOAc, washed with 1:1 water:brine and brine. The resulting yellow solution was dried over MgSO$_4$. The crude product was purified twice by column chromatography eluting with 10% EtOAc/DCM. The final product was dried overnight under vacuum at 50° C. to yield Gelator B as a white solid (1.48 g, 50%). $^1$H NMR (400 MHz, CDCl$_3$) δ 9.89 (s, 3H, CHO), 7.85 (d, 6H, aromatic), 7.04 (d, 6H, aromatic), 4.20 (s, 6H, CH$_2$), 1.39 (s, 3H, CH$_3$ head of bridge).

Mechanical Characterization

The gel transition ($t_1$) was detected by tabletop rheology. Gelation was determined by inversion of a 10 mm cylindrical vial (see Raghavan et al., in *Molecular Gels*, R. G. Weiss, P. Terech, Eds. (Netherlands, 2006), pp. 241-252). Rheometric data was obtained with a TA Instruments AR-G2 rheometer using 25 mm parallel aluminum plates at room temperature in a purging nitrogen atmosphere (thermoplastic) or in air (thermoset). Time sweep tests were performed at a strain of 0.1% and frequency of 1 Hz. HEMA thermoplastic samples were prepared by dissolving gelators (12 wt %, 3:2 mol ratio A:B) into 0.5 mL of HEMA. Next, CoNp promoter (0.1-0.3 wt %, 6% Co, Strem Chemicals), MEKP initiator (1.5 wt %, Luperox DDM-9, Sigma) and dichloroacetic acid catalyst (2 v/v %) were mixed and quickly transferred onto the plates. Thiolene thermoset samples were prepared similarly by mixing 1,3-glyceryl dimethacrylate (GDMA) solution (Gelator B and promoter in GDMA) and trimethylolpropane tris(3-mercaptopropionate) (TMPTMP) solution (Gelator A in TMPTMP). Inhibitor was incorporated by adding the necessary amount of a premixed 0.1 wt % cupferron GDMA stock solution. MEKP initiator, CoNp promoter, and catalyst were added sequentially, mixed, and the solution added to the plates.

Dynamic mechanical analysis experiments were performed with a TA Instruments RSA III. Solutions were cured in molds at room temperature for 24 hours (argon-filled glovebox for HEMA polymers) before cutting into rectangular specimens (dimensions: 5 mm×30 mm×0.5 mm). The tensile storage (E') and loss (E") moduli were recorded as a function of frequency (0.1-95 Hz) at 0.1% strain. Storage moduli at 10 Hz for two-stage thermoplastic (HEMA) and neat HEMA control were 1.16±0.11 and 1.41±0.01 GPa, respectively. Acid catalyst was not needed in the HEMA control to facilitate curing within 24 hours. Storage modulus (E') for two-stage thermoset (thiol-ene) and thiol-ene controls (2 v/v % DCA) at 10 Hz were 1.01±0.04 and 0.21±0.03 GPa, respectively. Acid catalyst was not needed in the HEMA control to facilitate curing within 24 hours. Storage modulus (E') for two-stage thermoset (thiol-ene) and thiol-ene control (2 v/v % DCA) at 10 Hz were 1.01±0.04 and 0.21±0.03 GPa, respectively.

Reagent Solutions

The formulation of each of the reagent solutions is given in Table 2. Gelators for Part A and Part B solutions were weighed into 10 mL scintillation vials. Monomer was added to each vial and the solution was sonicated for 5-10 min until the gelators dissolved. The additional components (acid gelation catalyst, polymerization initiator, and polymerization promoter) were added to their respective solutions and mixed using a vortex mixer. To visualize filling experiments more clearly, dye (Nile Red, perylene, or Oil Blue N; obtained from Sigma Aldrich) was added to the HEMA (0.5 mg/mL) prior to adding to the solutions. HEMA gel solutions used for fill characterization (FIG. 3B) did not contain initiator or promoter.

TABLE 2

Two-part solution composition for restoration experiments.

| | Thermoplastic Polymer[a] | | Thermoset Polymer[b] | |
|---|---|---|---|---|
| | Component | Amount | Component | Amount |
| Part A | Gelator A[c] (56%) | 0.146 g | Gelator A[c] (61%) | 0.146 g |
| | Catalyst | 40.8 µL | Catalyst | 35.6 µL |
| | Promoter | 2.1 µL | Promoter | 2.3 µL |
| | HEMA | 1 mL | Inhibitor | 0.80 mg |
| | | | TMPTMP[d] | 0.608 g |
| | | | GDMA (30%) | 0.415 g |
| Part B | Gelator A[c] (44%) | 0.093 g | Gelator A[c] (39%) | 0.093 g |
| | Gelator B | 0.053 g | Gelator B | .0.053 g |
| | Initiator | 31.0 µL | Initiator | 31.0 µL |
| | HEMA | 1 mL | GDMA (70%) | 0.977 g |

[a]Representative values for 2 mL of total monomer; amounts with respect to monomer.
[b]Representative values for 2 g of total monomer.
[c]12 wt % gelators (3:2 mol ratio A:B) which were divided for equal volume Part A - Part B solutions.
[d]TMPTMP:GDMA 1:1 molar ratio of functional groups.

Volume Deposition Testing

The basis for volume deposition testing is the drop-weight method, typically used to determine the surface tension of fluids. Tate's Law (Equation 1) describes the relationship between the surface tension and the weight of a drop that detaches from the bottom side of a vertically oriented cylinder under the influence of gravity:

$$mg = 2\pi r \sigma \psi \quad \text{(Equation 1)}$$

where m=mass of drop that separates from cylinder, g=gravitational constant, r=radius of cylinder, σ=surface tension of fluid, and ψ=Harkins-Brown correction factor. The Harkins-Brown correction factor is given by:

$$\psi = \frac{1}{2\pi}\left[0.14782 + 0.27896\left(\frac{r}{V^{\frac{1}{3}}}\right) - 0.166\left(\frac{r}{V^{\frac{1}{3}}}\right)^2\right] \quad \text{(Equation 2)}$$

where V=volume of drop that separates from the cylinder. Equation 1 can be rewritten as:

$$V_p = \frac{m}{\rho \psi} C \frac{\sigma}{\rho}, \text{ with } C = \left(\frac{2\pi r}{g}\right) \quad \text{(Equation 3)}$$

where $V_p$=volume of the pendant drop just before detachment, ρ=density of the test liquid, and C is the slope of the theoretical $V_p$=vs. ρ/g line (FIG. 2D).

Figure 6:
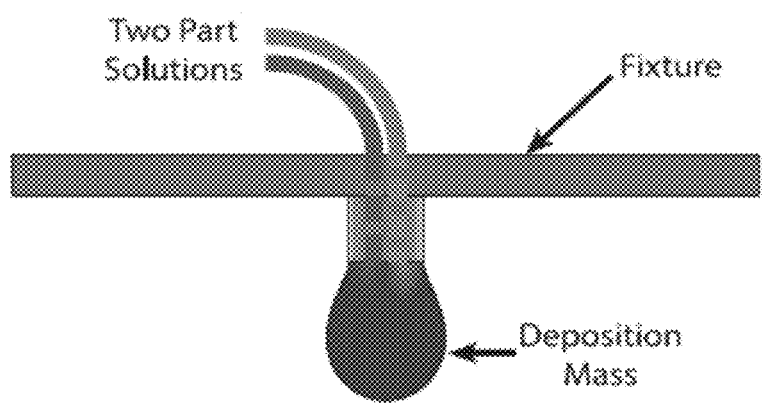
FIG. 6. Mass deposition test setup, according to one embodiment. Two part solutions (containing Gelators A and B, respectively) are delivered through channels in a fixture. Mass is deposited and suspends from a 2 mm diameter cylinder.

A test fixture was fabricated consisting of a 2 mm diameter cylinder with two 590 μm diameter channels machined along the axis of the cylinder with a center-to-center spacing of 630 μm (FIG. 6). A series of non-reactive fluids with published surface tension and density data (pentane, HEMA, dimethyl sulfoxide, ethylene glycol, glycerol, water), were used to verify that the test conformed to Tate's Law. Test fluids were allowed to drip from the test fixture under constant pressure. The fixture was suspended over an analytical balance (XS204 DeltaRange, Mettler Toledo) that recorded mass data continuously. At least 5 drips were used to determine the average mass of a detached droplet. A series of delivery pressures in the range of 1 to 50 kPa were tested to confirm that the drip mass was independent of pressure. The mass was converted to pendant drop volume using Equation 3. The pendant drop volume is plotted against the ratio of surface tension to density in FIG. 2D.

HEMA gel solutions (2 v/v % DCA catalyst, no initiator or promoter) with 10 wt % and 12 wt % gelators were tested using an alternate pumping schedule. Upon pumping, gel deposited on the bottom of the cylinder. The experiment was allowed to continue until the deposited solid mass detached from the fixture under the influence of gravity. The detached mass was recorded as the droplet mass for the test. Each of the gel concentrations was tested three times; the average is reported with error bars representing the high and low values of these three deposition tests (FIG. 2D). The HEMA gel data is plotted versus the surface tension and density of neat HEMA.

The surface tension for each reagent solution of the two-stage thermoplastic (HEMA) polymer was determined using the drop weight method and Equation 1. The values of surface tension for both solutions of the 10 wt % and 12 wt % gels as well as neat HEMA were determined to be 36 mN/m.

Pumping

Pumping experiments were performed using computer controlled (LabView v2013) pressure regulators (Ultimus V, Nordson EFD). Pressurized syringes delivered each part of the restorative chemistry through separate channels. The volumetric flow rate of each component was calibrated prior to testing. The pumping schedule consisted of an alternating scheme in which the B component was pumped for a 1 second pulse followed by a 3 second delay. The A component was then pumped for a 1 s pulse, followed by a delay of variable length. The delay length is dependent on gel time and differed for each specific restorative chemistry (gel time and pump schedule settings listed in Table 3).

TABLE 3

Gel time and pump schedule settings.

| Regeneration Chemistry | Gel Time (s) | Pump Delay (s) |
|---|---|---|
| HEMA Gel, 2 v/v % Catalyst | 30 ± 2 | 15 |
| HEMA Gel, 0.1 v/v % Catalyst | 239 ± 27 | 45 |
| Two-Stage Thermoplastic Polymer | 35 ± 3 | 15 |
| Two-Stage Thermoset Polymer | 37 ± 3 | 35 |

Pumping experiments were calibrated to deliver approximately 1 μL per syringe tip per pulse by tuning the delivery pressure of each syringe. The epoxy resin was delivered using an alternate delivery schedule to accommodate higher viscosity and to meet stoichiometric mixing. The resin component (Epon 8132) pulse time was increased from 1 second to 5.2 seconds, which was required to maintain a consistent deposition schedule at the maximum delivery pressure of 207 kPa. The curing agent (Epikure 3046) was delivered in a normal 1 second pulse.

Specimen Fabrication and Experimental Setup

Vascular specimens were fabricated using a cell casting technique in which silicone gaskets were sandwiched between two glass sheets. Channels were created by suspending 330 μm fluoropolymer monofilament within the mold. The channels possessed a mean center-to-center spacing of 380 μm and were located 500 μm on center from the top surface of the specimen. Epoxy (EPON 828/Epikure 3230, obtained from Momentive) was poured into the mold and cured at 80° C. for 2 hours and 125° C. for 3 hours. After curing, the epoxy sheet was removed from the mold and the monofilament was extracted by hand. Specimens were 3 mm thick and cut to 52 mm×52 mm with the channels located in the center of the specimen.

Cylindrical hole specimens were coated with a superoleophobic material (Ultra-Ever Dry, UltraTech International Inc.) on exterior surfaces. A drill press (RIKON 30-120) with bits of varying diameter was used to excise a cylindrical plug from the center of the sample. Impact specimens were coated with Freekote 55-NC (Henkel) non-wetting material prior to impact testing.

Filling experiments were performed under ambient conditions with samples affixed horizontally and leveled such that they experienced the full effect of gravity. Syringe tips (150 μm ID, Nordson EFD) were inserted into the microchannels. Overhead or perspective images were acquired for each experiment and pumping continued until the damage region filled or no detectable progress toward filling was observed after several minutes.

Impact Testing

Impact damage was created on the bottom side of the specimen using a drop-weight tower (Dynatup 8210) equipped with a 4 mm hemispherical tup. The drop height was 100 mm, with corresponding impact energy of 6.26 J. The specimen was clamped into a fixture with a 38 mm opening, and the impact tup was aligned to intersect the channels. After impact testing, specimens were prescreened to remove specimens which lacked mechanical integrity, or that possessed through holes significantly too large to be tested. Selected specimens were imaged using an overhead charge-coupled device (CCD) (Basler AF213423) with attached lens (Nikon AF Nikkor 50 mm 1:1.8 D) (FIG. 7A). Images were analyzed using Matlab software to determine the area of the central puncture. Fill experiments were conducted on specimens with central hole areas comparable to cylindrical hole experiments.

Fill Analysis

The area fill ratio of the cylindrical damage samples was determined by adding 0.0001% carbon black by weight (Regal 400R, Cabot) to both HEMA gel and neat HEMA control materials to improve the contrast of the gel solution against a white background. An overhead CCD with attached lens recorded images at a rate of 1 frame per second. ImageJ software was used to apply a threshold to the images and to calculate area filled.

Seal Testing

Seal test samples were allowed to cure following completion of the fill process. The cure conditions differed depending on the choice of restorative (regenerative) chemistry and damage geometry. Neat HEMA controls and HEMA two-stage polymer solutions were cured under an inert nitrogen atmosphere for 24 hours at room temperature. HEMA gel solutions (no initiator or promoter) were cured in both air and inert atmospheres. Thiol-ene two-stage polymer was cured at room temperature conditions in air. Epoxy was cured for 24 hours at room temperature in air. Specimens that remained liquid (HEMA controls) after the cure cycle were not tested under pressure. For impact damage, samples were filled with HEMA two-stage polymer and curing was conducted for 48 hours at room temperatures under inert nitrogen atmosphere.

Seal testing was performed using a pressure test cell with identical protocols for all damage geometries and healing chemistries (FIG. 7B). Samples were loaded on one side of the sample to 345 kPa pressure with nitrogen gas. An input transducer monitored pressure on the loading side of the sample. An output pressure transducer detected leakage across the restorative damage volume on the opposite side of the sample. Including a 30 second ramp, pressure was applied for 10 minutes duration. Fully sealed samples exhibited no detectable leakage across the sample for the entire duration of the test. Failure was determined as samples that did not seal the full 345 kPa pressure for the entire test. Seal data in FIG. 3C represent the percent of samples that achieved full sealing. Samples cured under an inert atmosphere for 24 hours sealed at a rate of 40% due to slow autopolymerization of the HEMA monomer. Epoxy samples cured for 24 hours at room temperature air atmosphere conditions sealed at a rate of 0%.

Contact Angle

Contact angle was used to characterize the non-wetting performance of sample coatings. A computer-controlled syringe pump (KD Scientific) deposited 5 µL of test fluid through a 150 µm syringe tip onto a level, polished and coated epoxy substrate. Images were recorded with a CCD (QImaging Micropublisher 3.3 RTV) and an attached lens (Nikon AF Micro Nikkor 60 mm 1:2.8D) illuminated from behind (Dolan-Jenner QVMABL). Images of surface droplets were analyzed using the DropSnake plugin (Stalder et al., *Colloid Surface A* 286, 92 (2006)) on ImageJ software. Twenty drops were analyzed and averaged for each combination of coating material and test liquid.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A polymer-formation system comprising a first composition and a second composition separated from one another, wherein the first composition is different from the second composition, and the first and second compositions are stable in isolation from each other, but react in the presence of each other; wherein the first composition comprises a first gelator and the first gelator comprises a plurality of acylhydrazine moieties;
the second composition comprises a second gelator and the second gelator comprises a plurality of formyl moieties;
at least one of the first composition and the second composition comprises a prepolymer;
one of the first composition and the second composition comprises a gelation catalyst; and
when combined, the first composition and the second composition react with one another, resulting in the formation of a gel prior to polymerization that results in a solid polymer.

2. The polymer-formation system of claim 1 wherein one of the first and second compositions comprises a polymerization promoter, and the other of the first and second compositions comprises a polymerization initiator.

3. The polymer-formation system of claim 1 wherein the first gelator comprises at least two acylhydrazine moieties, and the second gelator comprises at least three formyl moieties.

4. The polymer-formation system of claim 3 wherein a gelator is present in both the first and second compositions.

5. The polymer-formation system of claim 3 wherein the first gelator comprises bis-acylhydrazine terminated poly(ethylene)glycol.

6. The polymer-formation system of claim 3 wherein the second gelator comprises tris[(4-formylphenoxy) methyl] ethane.

7. The polymer-formation system of claim 3 wherein:

the first gelator comprises bis-acylhydrazine terminated poly(ethylene) glycol;
the second gelator comprises tris[(4-formylphenoxy) methyl]ethane;
the prepolymer comprises 2-hydroxyethyl methacrylate (HEMA) or a combination of trimethylolpropane tris (3-mercaptopropionate) (TMPTMP) and 1,3-glyceryl dimethacrylate (GDMA); and
the system optionally further comprises a polymerization initiator, a polymerization promoter, a polymerization inhibitor, or a combination thereof.

8. The polymer-formation system of claim 1 wherein the prepolymer is an alkyl acrylate, a thiol-ene, or a combination thereof.

9. The polymer-formation system of claim 8 wherein the alkyl acrylate is a monomer precursor selected from the group consisting of methyl acrylate, ethyl acrylate, butyl acrylate, 2-ethylhexyl acrylate, methyl methacrylate, ethyl methacrylate, butyl methacrylate, 2-hydroxyethyl methacrylate (HEMA), and 1,3-glyceryl dimethacrylate (GDMA), and if present, the thiol-ene is a monomer precursor selected from the group consisting of trimethylpropane tris(3-mercaptopropionate) (TMPTMP), triallyl-1,3,5-triazine-2,4,6-trione (TATATO), pentaerythritol tetra(3-mercaptopionate) (PETM), 1,2-ethylene glycol bis(3-mercaptopropionate), ethylene glycol bis(thioglycolate), trimethylolpropane tris(3-mercaptopropanoate), pentaerythritol (3-mercaptopropionate), trimethylolpropane tris(thioglycolate), and tris[2-(3-mercaptopropionyloxy)ethyl] isocyanurate.

10. The polymer-formation system of claim 1 wherein the first composition and the second composition, upon contacting each other, first form a gel, followed by a polymerization product within 24 hours, wherein the two transitions occur at ambient temperature.

11. The polymer-formation system of claim 1 wherein the system is a self-healing system.

12. A device for forming a polymer system, the device comprising a first vessel and a second vessel wherein:
the first vessel contains a first composition, and the second vessel contains a second composition, where the first composition is different from the second composition, and the first and second compositions are stable in isolation from each other, but react in the presence of each other;
the first composition comprises a first gelator, the first gelator comprising a plurality of acylhydrazine moieties;
the second composition comprises a second gelator, the second gelator comprising a plurality of formyl moieties;
at least one of the first composition and the second composition comprises a prepolymer;
one of the first composition and the second composition comprises a gelation catalyst;
the first composition or the second composition optionally further comprises a polymerization initiator, a polymerization promoter, a polymerization inhibitor, or a combination thereof; and
when combined, the first composition and the second composition react with one another, resulting in the formation of a gel prior to polymerization that results in a solid polymer.

13. The device of claim 12 wherein the first gelator comprises at least two acylhydrazine moieties and the second gelator comprises at least three formyl moieties.

14. The device of claim 13 wherein the first gelator comprises bis-acylhydrazine terminated poly(ethylene) glycol.

15. The device of claim 13 wherein the second gelator comprises tris[(4-formylphenoxy) methyl]ethane.

16. A method of forming a solid polymeric material, comprising:
providing a first composition and a second composition separated from one another, wherein the first composition is different from the second composition;
the first composition is a liquid and comprises a first gelator, the first gelator comprising a plurality of acylhydrazine moieties;
the second composition is a liquid and comprises a second gelator, the second gelator comprising a plurality of formyl moieties;
at least one of the first composition and the second composition comprises a prepolymer;
one of the first composition and the second composition comprises a gelation catalyst;
the first composition or the second composition optionally further comprises a gelation catalyst, a polymerization initiator, a polymerization promoter, a polymerization inhibitor, or a combination thereof; and
triggering the combination of the first composition and the second composition to initiate a dual-stage reaction of the components, the liquid reactants sequentially transitioning first to a gel, and second to a polymer, to form the solid polymeric material.

17. The method of claim 16 wherein the first gelator comprises at least two acylhydrazine moieties and the second gelator comprises at least three formyl moieties.

18. The method of claim 17 wherein the first gelator comprises bis-acylhydrazine terminated poly(ethylene) glycol and the second gelator comprises tris[(4-formylphenoxy) methyl]ethane.

19. The method of claim 16 wherein the prepolymer forms a thermoplastic or thermoset polymer.

20. The method of claim 16 wherein the polymeric material comprises a first polymer and a second polymer, wherein the first polymer comprises a polymer of Formula I:

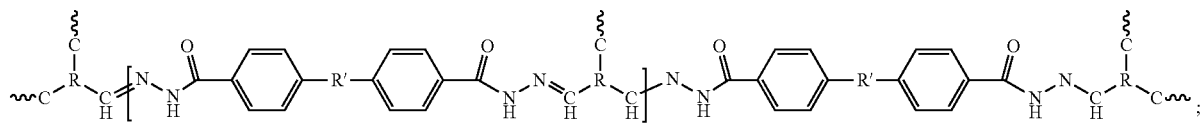

wherein ∼∼∼ is an additional moiety as shown within the brackets of Formula I;

R is

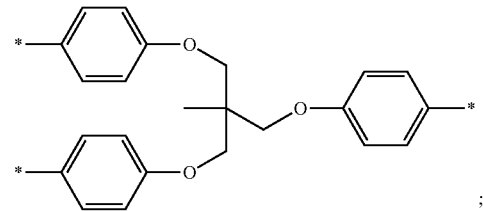 [SMILES: *c1ccc(OCC(C)(COc2ccc(*)cc2)COc2ccc(*)cc2)cc1]

and

R' is

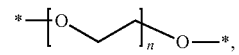

wherein n is about 3 to about 150; and the second polymer comprises a polymer of Formula II:

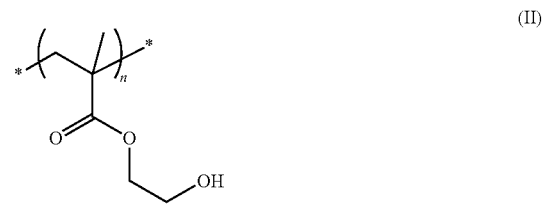

wherein n is about 100 to about 1,000;

or the second polymer comprises a polymer of Formula III:
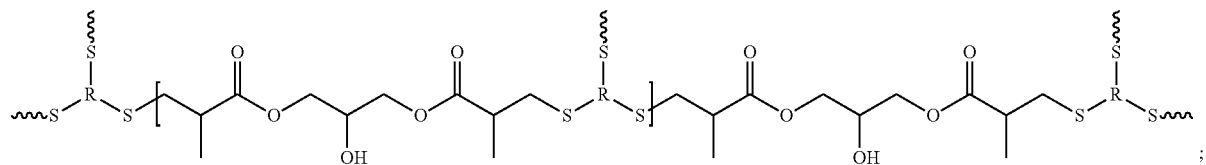
(III)
wherein:
～ is an additional moiety as shown within the brackets of Formula III; and
R is:
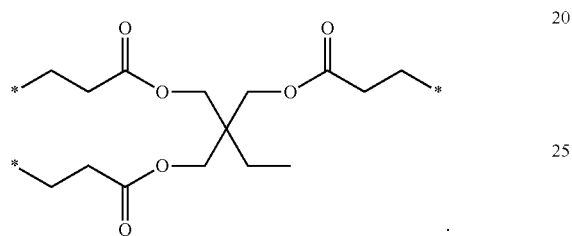
* * * * *

UNITED STATES PATENT AND TRADEMARK OFFICE
CERTIFICATE OF CORRECTION

PATENT NO. : 9,550,845 B2  
APPLICATION NO. : 14/626327  
DATED : January 24, 2017  
INVENTOR(S) : Scott White et al.

Page 1 of 1

It is certified that error appears in the above-identified patent and that said Letters Patent is hereby corrected as shown below:

In the Claims

Claim 20, at Columns 37-38, delete formula I:

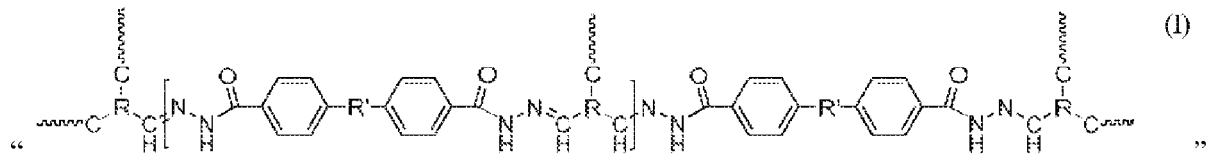

and insert:

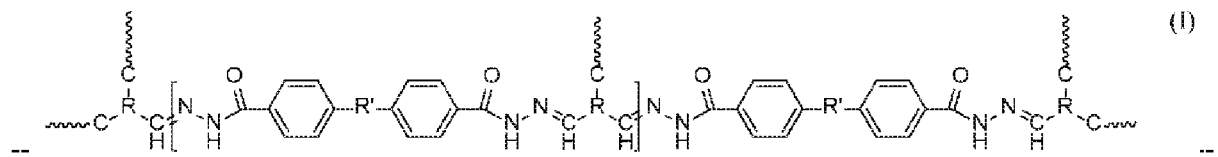

Signed and Sealed this  
Seventh Day of March, 2017

Michelle K. Lee  
*Director of the United States Patent and Trademark Office*